(12) United States Patent  
Wada et al.

(10) Patent No.: US 10,918,947 B2  
(45) Date of Patent: *Feb. 16, 2021

(54) GAME PROGRAM, GAME CONTROLLING METHOD, AND INFORMATION PROCESSING APPARATUS

(71) Applicant: GREE, Inc., Tokyo (JP)

(72) Inventors: Nariaki Wada, Tokyo (JP); Yoichi Shoda, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,422

(22) Filed: Mar. 28, 2019

(65) Prior Publication Data

US 2019/0217199 A1 Jul. 18, 2019

Related U.S. Application Data

(63) Continuation of application No. 15/224,732, filed on Aug. 1, 2016, now Pat. No. 10,286,319.

(30) Foreign Application Priority Data

Sep. 16, 2015 (JP) .............................. JP2015-183312

(51) Int. Cl.
*A63F 9/24* (2006.01)
*A63F 11/00* (2006.01)
(Continued)

(52) U.S. Cl.
CPC .............. *A63F 13/55* (2014.09); *A63F 13/25* (2014.09); *A63F 13/31* (2014.09); *A63F 13/327* (2014.09); *A63F 13/822* (2014.09); *A63F 13/847* (2014.09)

(58) Field of Classification Search
USPC ...................... 463/15, 20, 22, 25, 30, 31, 39
See application file for complete search history.

(56) References Cited

U.S. PATENT DOCUMENTS 6,672,964 B2 1/2004 Kobayashi
2003/0236111 A1 12/2003 Otani
(Continued)

FOREIGN PATENT DOCUMENTS

JP 2014-233637 A 12/2014
JP 5911993 B1 4/2016

OTHER PUBLICATIONS

Japanese Office Action dated Nov. 10, 2015 in corresponding Japanese Application No. 2015-188312; 8 pgs.
(Continued)

*Primary Examiner* — Adetokunbo O Torimiro
(74) *Attorney, Agent, or Firm* — Maier & Maier, PLLC

(57) ABSTRACT

A game program causes a computer to set, if it is determined that a point based on a first action of the character of each of an own player and another player is greater than or equal to a predetermined value, a specific period from a time when an instruction to input a second action has been first accepted from the own player or the other player as a cooperation accepting period, to accept the instruction to input the second action up to a maximum number of times set for each cooperation player from a cooperation player other than the player who has instructed input of the second action, among the own player and the other player, during the cooperation accepting period, and to vary an effect of the second action in accordance with the number of times of the instruction to input the second action.

20 Claims, 14 Drawing Sheets

(51) Int. Cl.
　　　*G06F 13/00*　　　(2006.01)
　　　*G06F 17/00*　　　(2019.01)
　　　*A63F 13/55*　　　(2014.01)
　　　*A63F 13/822*　　(2014.01)
　　　*A63F 13/31*　　　(2014.01)
　　　*A63F 13/327*　　(2014.01)
　　　*A63F 13/847*　　(2014.01)
　　　*A63F 13/25*　　　(2014.01)

(56)　　　　　　References Cited

U.S. PATENT DOCUMENTS

2007/0117632 A1　　5/2007　Nakanishi
2014/0364975 A1　　12/2014　Wohl
2017/0072315 A1　　3/2017　Wada et al.

OTHER PUBLICATIONS

"Extroopers official web manual", CAPCON, URL:http://game.capcom.com/manual/ext/PS3/page-42.html, Published on 2012, Accessed Oct. 28, 2015; 17 pgs.
"The playstation books Favorite Dear official guidebook", Softbank Publishing, Published on Jul. 30, 1999, p. 27; 3 pgs.
"Shirokishi Monogatari episode portable Dogma Wars official guidebook", Enterbrain, Published on Apr. 12, 2011, p. 42; 3 pgs.
Office Action dated Sep. 10, 2019, in corresponding Japanese Application No. 2016-105561; 13 pages.
Office Action dated Apr. 16, 2020, in corresponding Japanese Application No. 2016-105561, 6 pages.

FIG. 6A

| PLAYER ID | NAME | LEVEL | HP | MP | POSITION | IMAGE | OCCUPATION | ATTRIBUTE | OWN SKILL | OWN KILLER ACTION | ... |
|---|---|---|---|---|---|---|---|---|---|---|---|
| C001 | CHARACTER A | 3 | 50 | 30 | (50, 35, 65) | G023.png | FIGHTER | WATER | SKILL A, SKILL B, ... | KILLER ACTION A, KILLER ACTION B, ... | ... |

FIG. 6B

| PLAYER ID | NAME | LEVEL | HP | MP | POSITION | IMAGE | ... |
|---|---|---|---|---|---|---|---|
| C013 | CHARACTER B | 3 | 50 | 30 | (50, 35, 65) | G017.png | ... |
| C021 | CHARACTER C | 10 | 150 | 100 | (50, 35, 65) | G044.png | ... |

FIG. 6C

| ACCUMULATED POINT | TIME |
|---|---|
| 1 | 0:23 |
| 3 | 1:01 |
| ... | ... |

FIG. 6D

| ACTIVATION PLAYER ID | TIME | COOPERATION PLAYER ID |
|---|---|---|
| C001 | 3:12 | C021 |
| C021 | 6:54 | C001, C013 |
| ... | ... | ... |

(B2) SKILL — (B2-1) OFFENSIVE SKILL — (B2-2) FIRE-ATTRIBUTE SKILL
  — (B3-2) WATER-ATTRIBUTE SKILL
  — ...
  — (B3-1) DEFENSIVE SKILL — ...
  — ...
(B3) ATTACK —
...

GAME PROGRAM, GAME CONTROLLING METHOD, AND INFORMATION PROCESSING APPARATUS

PRIORITY

This application is a continuation of and claims priority to U.S. application Ser. No. 15/224,732, filed Aug. 1, 2016, and entitled "GAME PROGRAM, GAME CONTROLLING METHOD, AND INFORMATION PROCESSING APPARATUS", the disclosures of which are incorporated herein by reference.

FIELD

The present invention relates to a game program, a game controlling method, and an information processing apparatus.

BACKGROUND

In recent years, games provided to mobile terminals via communication networks have included "battle games." In such a battle game, multiple players who may each operate a mobile terminal cooperatively fight against an enemy character. In a multiplayer battle game, a special skill of a character may be activated, and heavy damage may be done to the enemy character, or a friend character in the same group may be affected (for example, the skill may cause recovery of a hit point (HP) of a friend character). A special skill may be activated in response to an input operation of one player in the group.

For example, Japanese Unexamined Patent Application Publication No. 2014-233637 describes a battle game in which a raid battle is performed. In the raid battle, a player battles against an enemy character in cooperation with other players. In the raid battle in the multiplayer battle game, if the amount of points given to a specific player from the other players is greater than or equal to a predetermined value, an attack having a power corresponding to the point is made to the enemy character in response to an instruction from the specific player.

However, since a special skill is activated in response to an input operation of only one player in the multiplayer battle game in the related art, it is not possible to reflect the intentions of cooperation or agreement of the other players to the activation of the special skill in the magnitude of the effect of the special skill. In addition, for example, the players individually enhance their skills in order to vary the magnitude of the effect of the special skill. Accordingly, an individual player has no option but to make an effort in order to greatly vary the effect of the skill. No mechanism is provided in which an individual player greatly varies the effect of the skill in cooperation with the other players in the same group.

SUMMARY

In order to resolve the above problems, according to an exemplary embodiment, a game program, a game controlling method, and an information processing apparatus capable of reflecting the intentions of cooperation or agreement of other players to activation of a special action in the effect of the special action may be provided.

According to an exemplary embodiment of the present invention, a game program may cause a computer that includes a storage unit and that provides a game to execute storing a point in the storage unit on the basis of a first action of a character of each of an own player and another player, the first action being performed in accordance with input instructions from the own player and the other player; determining whether the point stored in the storage unit is greater than or equal to a predetermined value; setting, if the determining determines that the point is greater than or equal to the predetermined value, a specific period from a time when an instruction to input a second action has been first accepted from the own player or the other player as a cooperation accepting period; accepting the instruction to input the second action up to a maximum number of times set for each cooperation player from a cooperation player other than the player who has instructed input of the second action, among the own player and the other player, during the cooperation accepting period; and varying an effect of the second action in accordance with the number of times of the instruction to input the second action accepted from the cooperation player. The computer may be any computer capable of executing the above steps; for example, the computer may be a mobile terminal, a stationary terminal, or a server.

According to an exemplary embodiment, the game program may cause the computer to further execute varying the effect of the second action in accordance with an attained period from a time when the game has been started to a time when the point has been determined to be greater or equal to the predetermined value.

According to an exemplary embodiment, the game program may cause the computer to further execute displaying an operation button to activate the second action only during the cooperation accepting period. According to an exemplary embodiment, an operation to input the second action accepted during the cooperation accepting period may be an operation to select the operation button.

According to an exemplary embodiment, in the game program, a display mode of the operation button may be varied depending on the attained period in the displaying.

According to an exemplary embodiment, in the game program, the operation button may be displayed so as to move at a speed corresponding to the attained period in the displaying.

According to an exemplary embodiment, the game program may cause the computer to further execute displaying a gauge having a length corresponding to the point stored in the storage unit.

According to an exemplary embodiment, the game program may cause the computer to further execute displaying an area having a certain angle with an apex of a first position on a display screen, which may be specified by the own player, on the display screen as a specific area and, when a second position in the specific area is specified by the own player, accepting the specification of the second position as an instruction to input the first action.

According to an exemplary embodiment, a game controlling method for a computer that includes a storage unit and that provides a game may include storing a point in the storage unit on the basis of a first action of a character of each of an own player and another player, the first action being performed in accordance with input instructions from the own player and the other player; determining whether the point stored in the storage unit is greater than or equal to a predetermined value; setting, if the determining determines that the point is greater than or equal to the predetermined value, a specific period from a time when an instruction to input a second action has been first accepted from the own player or the other player as a cooperation accepting period; accepting the instruction to input the second action up to a maximum number of times set for each cooperation player from a cooperation player other than the player who has instructed input of the second action, among the own player and the other player, during the cooperation accepting period; and varying an effect of the second action in accordance with the number of times of the instruction to input the second action accepted from the cooperation player.

According to an exemplary embodiment, an information processing apparatus that provides a game may include a storage unit that stores a point on the basis of a first action of a character of each of an own player and another player, the first action being performed in accordance with input instructions from the own player and the other player; an accumulation unit that determines whether the point stored in the storage unit is greater than or equal to a predetermined value; a cooperation unit that, if the accumulation unit determines that the point is greater than or equal to the predetermined value, sets a specific period from a time when an instruction to input a second action has been first accepted from the own player or the other player as a cooperation accepting period and accepts the instruction to input the second action up to a maximum number of times set for each cooperation player from a cooperation player other than the player who has instructed input of the second action, among the own player and the other player, during the cooperation accepting period; and an activation unit that varies an effect of the second action in accordance with the number of times of the instruction to input the second action accepted from the cooperation player.

According to an exemplary embodiment, the game program, the game controlling method, and the information processing apparatus may be capable of varying the effect of a special action in accordance with the number of players cooperating in the special action.

BRIEF DESCRIPTION OF THE DRAWINGS

Exemplary

Exemplary

Exemplary

Exemplary

Exemplary

Exemplary

Exemplary

Exemplary

Exemplary

Exemplary

Exemplary FIG. 6A illustrates an exemplary data structure detailing player and game information.

Exemplary FIG. 6B illustrates an exemplary data structure detailing player and game information.

Exemplary FIG. 6C illustrates an exemplary data structure detailing player and game information.

Exemplary FIG. 6D illustrates an exemplary data structure detailing player and game information.

Exemplary

Exemplary

Exemplary

Exemplary

Exemplary

Exemplary

Exemplary

Exemplary

Exemplary

Exemplary

Exemplary

DETAILED DESCRIPTION

Exemplary embodiments may herein be described with reference to the attached drawings. However, the technical scope of the present invention is not limited to said exemplary embodiments.

Figure 1:
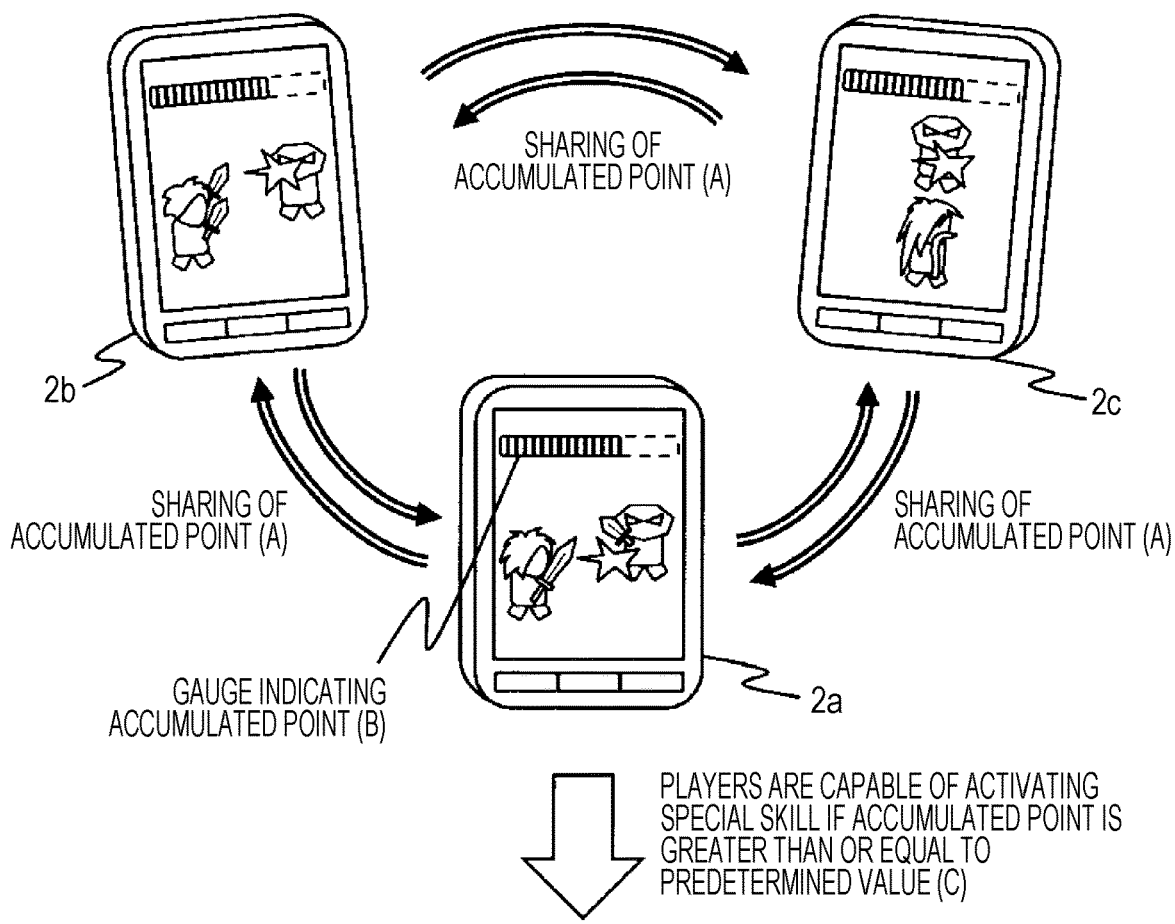
FIG. 1 is a schematic diagram for describing an exemplary battle game.
Figure 1:
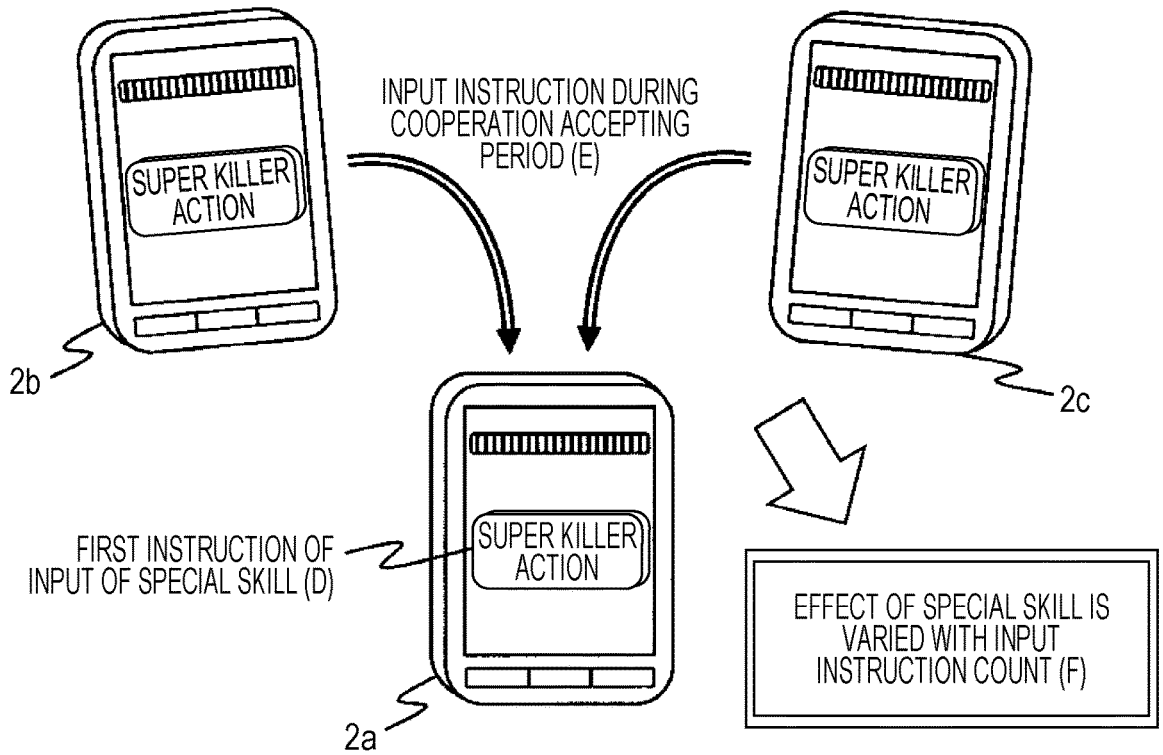

Turning now to exemplary FIG. 1, FIG. 1 is a schematic diagram for describing an exemplary battle game realized by multiple mobile terminals in cooperation with terminal game programs installed in the respective mobile terminals. A battle game provided by the multiple mobile terminals in the present embodiment may be described with reference to FIG. 1.

According to an exemplary embodiment, a player of the battle game may operate his/her own mobile terminal 2a to perform the battle game in which his/her character is in a cooperative relationship with characters of other players. The player himself/herself is hereinafter referred to as an own player, the character of the own player is hereinafter referred to as an own character, the players other than the own player are hereinafter referred to as other players, and the characters of the other players are hereinafter referred to as other characters. The multiple other players operate their own mobile terminals, for example the own mobile terminals 2b and 2c, to perform the battle game using the respective other characters. The mobile terminals 2a, 2b, and 2c may be hereinafter collectively referred to as a mobile terminal 2.

In the battle game, the own character and one or more other characters may be movably arranged in the same battle game space, and may fight with one or more enemy characters existing in the battle game space. During the fight, the own character and the other character may perform normal actions in accordance with the operations of the own player and the other player. Hit points (HPs) may be associated with characters, for example the own character, the other character, and the enemy character. The HP of each character may be varied in accordance with, for example, the actions of another character who the character is fighting with. If the character has their HP become a predetermined value (for example, zero) or less as the result of the fight, the character may be disabled and unable to fight with the other characters, or this may result in defeat. Another example of a physical power parameter or a life parameter, other than HP, may be used by each character to continue the battle game.

The normal actions that may be performed by characters may include behaviors, such as attack, defense, use of an item, and activation of a skill, performed by each character. Normal actions may affect the enemy character, the own character, and/or the other character in the fight. An attack or attack behavior may be a behavior to decrease the HP associated with the enemy character. A defense or defense behavior may be a behavior to reduce the amount of decrease in the HP upon reception of the behavior to decrease the HP associated with the own character from the enemy character. An item may be, for example, a recovery item to increase the HP associated with the own character or the other character, an attack item to decrease the HP associated with the enemy character, or a defense item to reduce the amount of decrease in the HP upon reception of the behavior to decrease the HP associated with the own character. A skill may be a special ability of each character and/or a special ability which each character learns in the battle game. A skill may be, for example, an attack magic to decrease the HP associated with the enemy character, a killer action to decrease the HP associated with the enemy character by an amount larger than that of the attack magic, or a recovery magic to increase the HPs associated with the own character and the other character. According to an exemplary embodiment, each character may consume a magic point (MP) of the character to activate the skill. According to another exemplary embodiment, another activation parameter other than the MP may be consumed to activate a specific behavior, such as the skill. According to an exemplary embodiment, a normal action may be an example of a first action.

According to an exemplary embodiment, an own player may make a team with two players, selected from among multiple players, before the battle game is started. The players may be capable of making a team in response to a cooperation request in the battle game from the own player to the other players, in response to a coordinate request in the battle game from the other players to the own player, or in response to an invitation from the own character to the other characters existing in a game space different from the battle game space. At start of the battle game, the own character and the other characters belonging to the team may fight with one or more enemy characters existing in the game space. According to an exemplary embodiment, the number of players belonging to one team may not be limited to three.

In the battle game, the skills of the own character and the other characters may be activated in response to input instructions from the own player and the other players. Points may be stored on the basis of the activated skills. For example, when a skill, such as the attack magic, of the own character or one of the other characters is activated once and the skill hits on the enemy character (for example, the decrease in the HP associated with the enemy character succeeded), one point may be stored for the skill. In this case, when the skill is used by the own player to hit an enemy character three times, and the skill is used by the other players to hit an enemy character a total of five times during the battle game, a total of eight points accumulated by the players for the skills may be stored. The points that are accumulated and stored may be hereinafter referred to as accumulated points. According to an exemplary embodiment, a point may be stored when a normal action other than a skill has been performed. For example, one point may be stored each time an attack by the own character or by one of the other characters is successful, and the accumulated points may increase according to the number of times of success of the attack by each character. The amount of points stored in response to one activation of the skill may be varied in accordance with the kind of the skill. For example, when a high-level skill is activated once, a higher amount of points (for example, three points) may be stored, compared with a case in which a low-level skill is activated. According to an exemplary embodiment, a point may be added in response to activation of the skill or execution of the attack.

According to an exemplary embodiment, the mobile terminal 2a of the own player and the mobile terminals 2b and 2c of the other players may share the accumulated point and display the accumulated point in real time (refer to (A) in FIG. 1). A gauge may be used to display the accumulated point in each of the mobile terminals 2a, 2b, and 2c (refer to (B) in FIG. 2). The gauge may be a bar graph having a length corresponding to the accumulated point. For example, the accumulated points, up to a predetermined value such as 10 points, may be displayed in the gauge. According to another exemplary embodiment, another predetermined value may be used as an upper limit of the points displayed in the gauge.

According to an exemplary embodiment, the mobile terminal 2a of the own player and the mobile terminals 2b and 2c of the other players may determine whether 10 points or more are stored as the accumulated point. If 10 points or more are stored as accumulated points, the own player and the other players may be capable of activating a special skill (refer to (C) in FIG. 1). According to an exemplary embodiment, the special skill may be an example of a second action. The second action may be a behavior that has an impact greater than that of the first action on the enemy character, the own character, and/or other characters. For example, the special skill may be a special attack magic to decrease the HP associated with the enemy character by an amount larger than that in a case in which a skill, such as an attack magic, is activated, or may be a special recovery magic to increase the HPs associated with the own character and other characters by an amount larger than that in a case in which a skill, such as a recovery magic, is activated. In another example, the special attack may be a behavior that decreases the HP associated with the enemy character by an amount larger than that in a case in which the standard attack is performed.

According to an exemplary embodiment, when the special skill is capable of being activated, a special skill activation button used to activate the special skill may be displayed in each of the mobile terminal 2a and the mobile terminals 2b and 2c. Upon first selection of the special skill activation button by any of the own player and the other players (refer to (D) in FIG. 1), an instruction to activate the special skill may be stored. The special skill activation button may be an example of an operation button. Next, a specific period (for example, five seconds) from the time when the activation of the special skill has been instructed may be set as a cooperation accepting period. A player who has first selected the special skill activation button may be hereinafter referred to as an activation player.

Next, during the cooperation accepting period, it may be determined whether any of the cooperation players have likewise sent instructions for the special skill to be activated. The cooperation players may be players other than the activation player, among the own player and the other players. If any of the cooperation players selects the special skill activation button displayed in the mobile terminal 2 of the cooperation player (refer to (E) in FIG. 1), it is determined that the cooperation player has likewise sent instructions for the special skill to be activated. Each cooperation player may be capable of selecting the special skill activation button displayed in the mobile terminal 2 of the cooperation player once during the cooperation accepting period. According to an exemplary embodiment, there may be a maximum number of times (for example, three times) when the special skill activation button is capable of being selected during the cooperation accepting period; this maximum may be set for each cooperation player. In this case, each cooperation player may be capable of selecting the special skill activation button up to the maximum number of times. A total maximum number of times, which is the total of the number of times when each player is capable of selecting the special skill activation button during the cooperation accepting period, may be set in advance. In this case, the respective cooperation players are capable of selecting the special skill activation button during the cooperation accepting period up to the total maximum number of times.

According to an exemplary embodiment, the effect of the special skill may be varied with the number of times the special skill activation button is selected by the cooperation players during the cooperation accepting period (refer to (F) in FIG. 1). The effect of the special skill may be the degree of effect to the enemy character, the own character, and/or the other characters. The effect of the special skill may be, for example, the amount of damage to the enemy character or the amounts of recovery from the damages of the own character and the other characters. According to an exemplary embodiment, the amount of damage or the amount of recovery may be increased as the number of times of selection is increased.

According to an exemplary embodiment, upon termination of the cooperation accepting period, the special skill that the activation player has instructed the game to activate may be activated with the varied effect.

As described above, it may be possible to vary the effect of a special action if the cooperation players cooperate with the activation player in the activation of the special action or agree with the activation of the special action by the activation player. Accordingly, the intentions of cooperation or agreement of the cooperation players are capable of being reflected in the effect of the special action. In addition, since a great amount of cooperation or agreement from the cooperation players may change the effect of the special action, an exemplary embodiment of a battle game may include requesting a strategy from each player so that the special action is activated in an appropriate scene in the progress of the battle game, thereby improving a sense of entertainment of the battle game.

Figure 2:
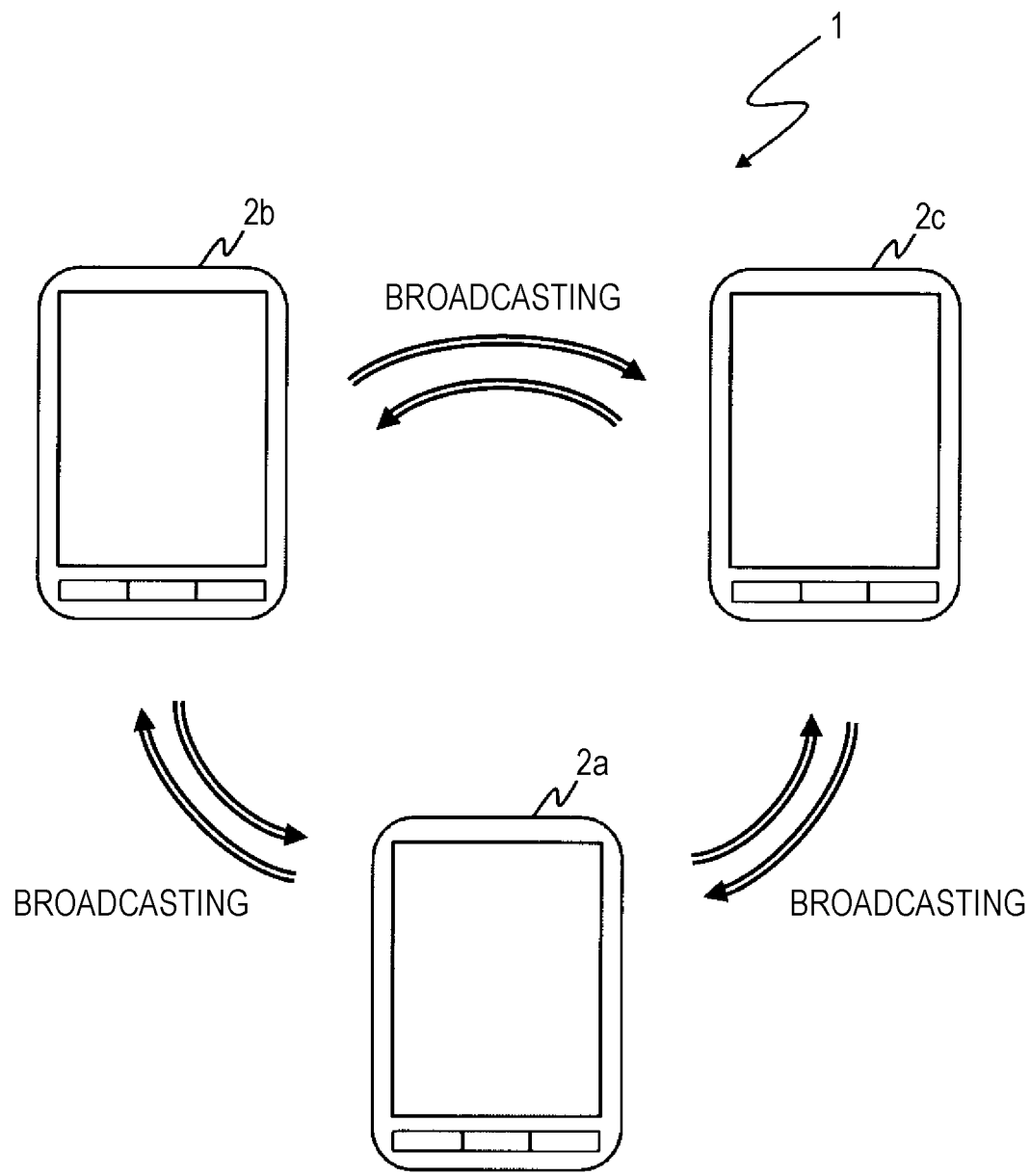
FIG. 2 illustrates an exemplary schematic configuration of a game system.

Turning now to exemplary FIG. 2, FIG. 2 illustrates an exemplary schematic configuration of a game system 1.

Referring to FIG. 2, the game system 1 may include the mobile terminals 2a, 2b, and 2c of an own player A and other players B and C, respectively, belonging to the same team. The mobile terminals 2a, 2b, and 2c may be connected to each other via a communication network. For example, the mobile terminals 2a, 2b, and 2c may be connected to each other via a base station, a mobile communication network, a gateway, or the Internet (not illustrated). Each of the mobile terminals 2a, 2b, and 2c may broadcast game control data corresponding to the progress of the battle game to the other mobile terminals. The game control data may at least include, for example, the HP and the MP of each character, the position of each character in the battle game space, an action that is executed, and identifiers (IDs) of the other characters (including the enemy character) affected by the action. The game control data may include, for example, the level of each character, an item owned by each character, a card owned by each character, the skill of each character, the HP and the MP of the enemy character, and the position of the enemy character in the battle game space.

Figure 3:
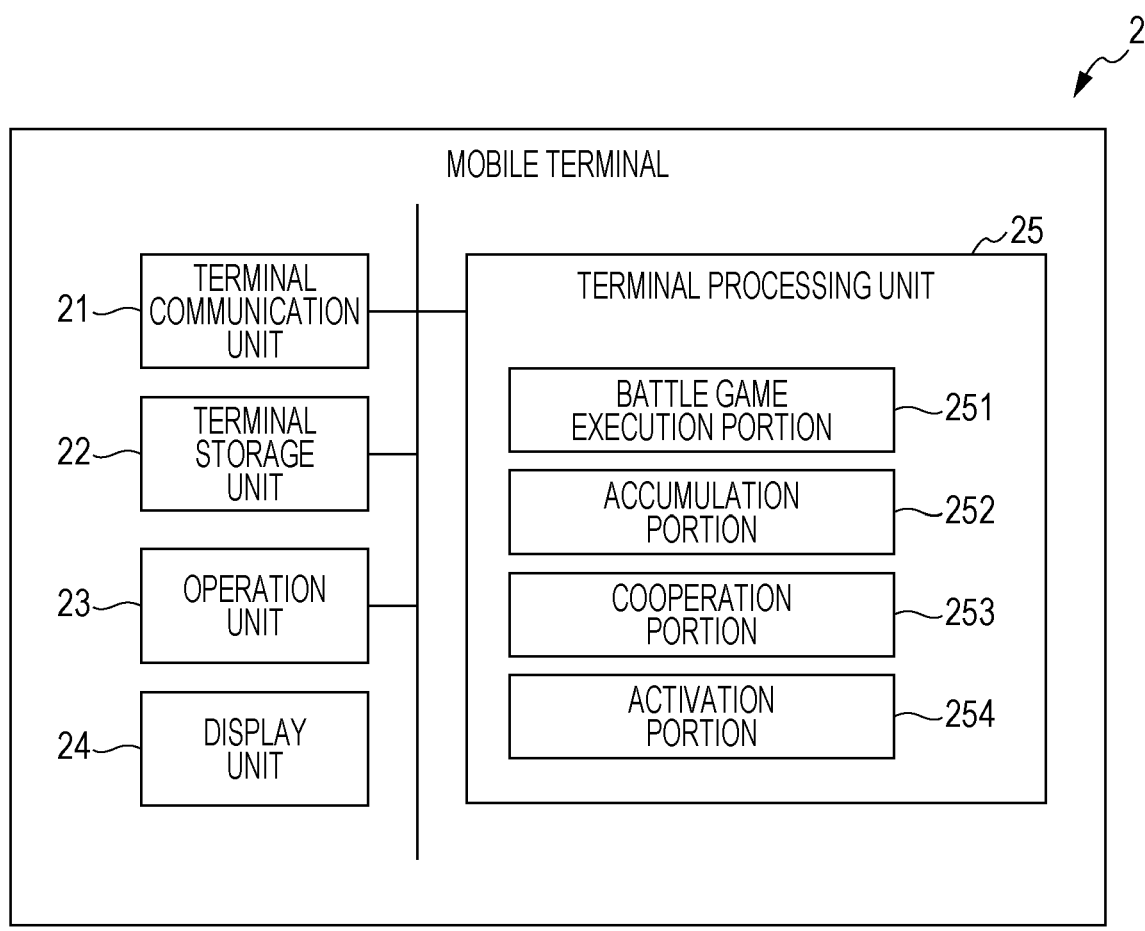
FIG. 3 is a block diagram illustrating an exemplary schematic configuration of a mobile terminal.

Turning now to exemplary FIG. 3, FIG. 3 is a block diagram illustrating an exemplary schematic configuration of the mobile terminal 2.

A mobile terminal 2 may be connected to other mobile terminals via the base station, the mobile communication network, the gateway, or the Internet, each of which may allow communication with the other mobile terminals. The mobile terminal 2 may control the progress of the game in accordance with an operation by the player with an operation unit 23 (for example, a touch panel). In addition, the mobile terminal 2 may receive a variety of data from the other mobile terminals to control the progress of the game. In order to communicate with the other mobile terminals and control the progress of the game, the mobile terminal 2 may include a terminal communication unit 21, a terminal storage unit 22, the operation unit 23, a display unit 24, and a terminal processing unit 25.

Although a multifunctional mobile phone or "smartphone" is displayed as the mobile terminal 2 in the Figures, the present embodiment is not limited to smartphones. The mobile terminal 2 may be, for example, a mobile phone (so called feature phone), a mobile information terminal (a personal digital assistant (PDA)), a mobile game machine, a mobile music player, a tablet terminal, a tablet personal computer (PC), or a laptop PC as long as the present invention is applicable to the mobile terminal 2.

Referring again to exemplary FIG. 3, the terminal communication unit 21 may include a communication interface circuit including an antenna having a sensitive bandwidth of a certain frequency band, and may be used to connect the mobile terminal 2 to a wireless communication network. The terminal communication unit 21 may establish a wireless signal line adopting, for example, a Code Division Multiple Access (CDMA) method with the base station via a channel allocated by the base station to communicate with the base station. The terminal communication unit 21 may transmit data supplied from the terminal processing unit 25 to, for example, the other mobile terminals 2. In addition, the terminal communication unit 21 may supply data received from, for example, the other mobile terminals 2 to the terminal processing unit 25. The terminal communication unit 21 may periodically broadcast the variety of data to the other mobile terminals 2, and may also transmit the variety of data in response to a request from the other mobile terminals 2.

The terminal storage unit 22 may include, for example, a semiconductor memory. The terminal storage unit 22 may store, for example, an operating system program, driver programs, application programs, and data used in the processing in the terminal processing unit 25. The terminal storage unit 22 may store as the driver programs, for example, an input device driver program used to control the operation unit 23 and an output device driver program used to control the display unit 24. The terminal storage unit 22 may store as the application program, for example, a terminal game program used to advance the battle game on the basis of instruction data input by the player with the operation unit 23, the game control data acquired from the other mobile terminals 2, and so on to display display data involved in the progress of the battle game. The terminal storage unit 22 may store as the data, for example, the game control data acquired from the other mobile terminals 2, the display data involved in the progress of the game, video data, and image data. The terminal storage unit 22 may temporarily store temporary data relating to a specific process.

According to an exemplary embodiment, the operation unit 23 may be any device as long as the mobile terminal 2 is capable of being operated with the operation unit 23. The operation unit 23 may be, for example, a touch panel or key buttons. According to an exemplary embodiment, the player may be capable of inputting characters, figures, symbols, and so on with the operation unit 23. When the operation unit 23 is operated by the player, the operation unit 23 may generate a signal corresponding to the operation. The generated signal may be supplied to the terminal processing unit 25 as an instruction from the player.

According to an exemplary embodiment, the display unit 24 may also be any device as long as a video, an image, or the like is capable of being displayed in the display unit 24. The display unit 24 may be, for example, a liquid crystal display or an organic electroluminescence (EL) display. According to an exemplary embodiment, the display unit 24 may display a video corresponding to video data supplied from the terminal processing unit 25 or an image corresponding to image data supplied from the terminal processing unit 25.

According to an exemplary embodiment, the terminal processing unit 25 may include one or more processors and their peripheral circuits. The terminal processing unit 25 may integrally control the entire operation of the mobile terminal 2 and may be, for example, a central processing unit (CPU). The terminal processing unit 25 may control the operations of the terminal communication unit 21, the display unit 24, and so on so that various processes in the mobile terminal 2 are performed in appropriate procedures on the basis of, for example, the programs stored in the terminal storage unit 22 and operations with the operation unit 23. The terminal processing unit 25 may perform the processes on the basis of the programs (the operating system program, the driver programs, the application programs, and so on) stored in the terminal storage unit 22. According to an exemplary embodiment, the terminal processing unit 25 may be capable of executing multiple programs (for example, the application programs) in parallel.

According to an exemplary embodiment, the terminal processing unit 25 may at least include a battle game execution portion 251, an accumulation portion 252, a cooperation portion 253, and an activation portion 254. These portions may be functional modules realized by the programs executed by the one or more processors in the terminal processing unit 25. These portions may be installed in the mobile terminal 2 as firmware.

Exemplary FIGS. 4A to 4C and FIGS. 5A to 5D may each illustrate exemplary display screens of the battle game, which are displayed in the mobile terminals 2a, 2b, and 2c.

Figure 4A:
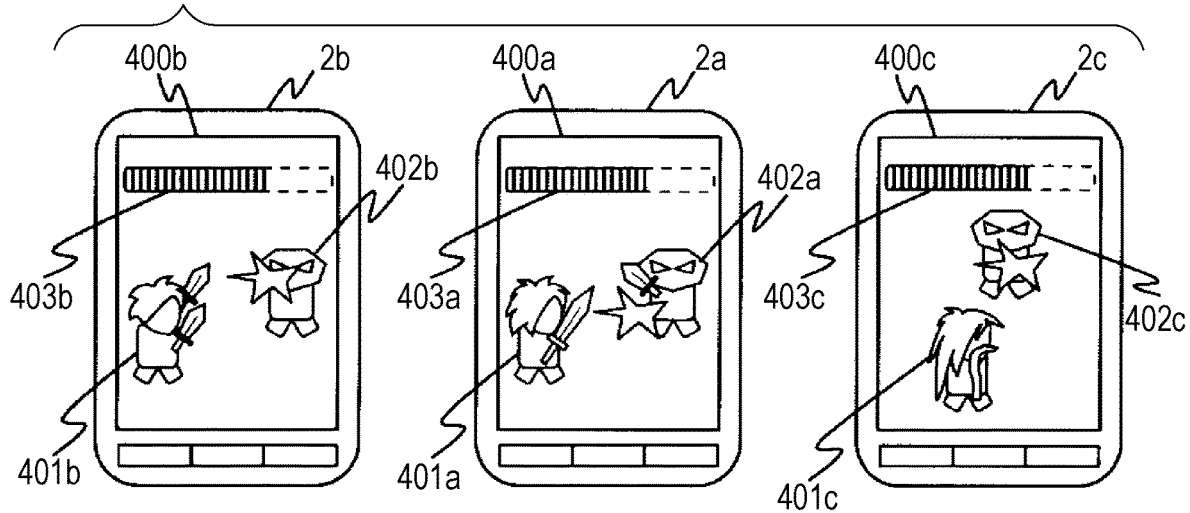
FIG. 4A illustrates an exemplary display screens of the battle game.

FIG. 4A illustrates examples of battle game screens 400a, 400b, and 400c displayed in the mobile terminals 2a, 2b, and 2c, respectively. The mobile terminal 2a may be a mobile terminal of the own player A and the mobile terminals 2b and 2c may be mobile terminals of the other players B and C. According to an exemplary embodiment, a battle game space within a certain range around an own character 401a may be displayed on the battle game screen 400a. Similarly, battle game spaces within certain ranges around other characters 401b and 401c may be displayed on the battle game screens 400b and 400c, respectively. According to an exemplary embodiment, the own character 401a and an enemy character 402a may be movably arranged in the same battle game space, the other character 401b and an enemy character 402b may be movably arranged in the same battle game space, and the other character 401c and an enemy character 402c may be movably arranged in the same battle game space. For example, when the range of the battle game space displayed on the battle game screen 400a is varied with a movement of the own character 401a, the enemy character 402a may not be displayed on the battle game screen 400a and another enemy character may be displayed thereon depending on the position of the enemy character 402a in the battle game space.

According to an exemplary embodiment, when a so-called boss character which the own character 401a and the other characters 401b and 401c cooperatively fight with is the enemy character, the enemy characters 402a, 402b, and 402c may be the same character. In this case, the position of the enemy character (boss character) in the battle game space, the HP and the MP of the enemy character (boss character), and so on may be shared between the mobile terminals 2a, 2b, and 2c. According to another exemplary embodiment, when enemy characters other than the boss character are the enemy characters 402a, 402b, and 402c, respectively, which the own character 401a and the other characters 401b and 401c individually fight with, the enemy characters 402a, 402b, and 402c may be different characters. In this case, the positions of the enemy characters (the enemy characters other than the boss character) in the battle game space, the HPs and the MPs of the enemy characters (the enemy characters other than the boss character), and so on may not be shared between the mobile terminals 2a, 2b, and 2c.

Gauges 403a, 403b, and 403c may be displayed on the battle game screens 400a, 400b, and 400c, respectively. The gauges 403a, 403b, and 403c may have a length corresponding to the accumulated points. The accumulated points may be calculated by, when the skills activated by the own character 401a and the other characters 401b and 401c have hit on the enemy characters, determining the points generated and incrementing the points corresponding to the skills. The accumulated points may be accumulated in cooperation between the own character 401a and the other characters 401b and 401c. The gauges 403a, 403b, and 403c displayed on the battle game screens 400a, 400b, and 400c, may, respectively, have the same value. The gauges 403a, 403b, and 403c may be at their maximum length when the value of the accumulated points is greater than or equal to a predetermined value (for example, 10 points). Displaying of the gauges 403a, 403b, and 403c on the battle game screens 400a, 400b, and 400c, respectively, may enable the own player A and the other players B and C to visually recognize the points necessary to be accumulated in order to activate the special skill.

Figure 4B:
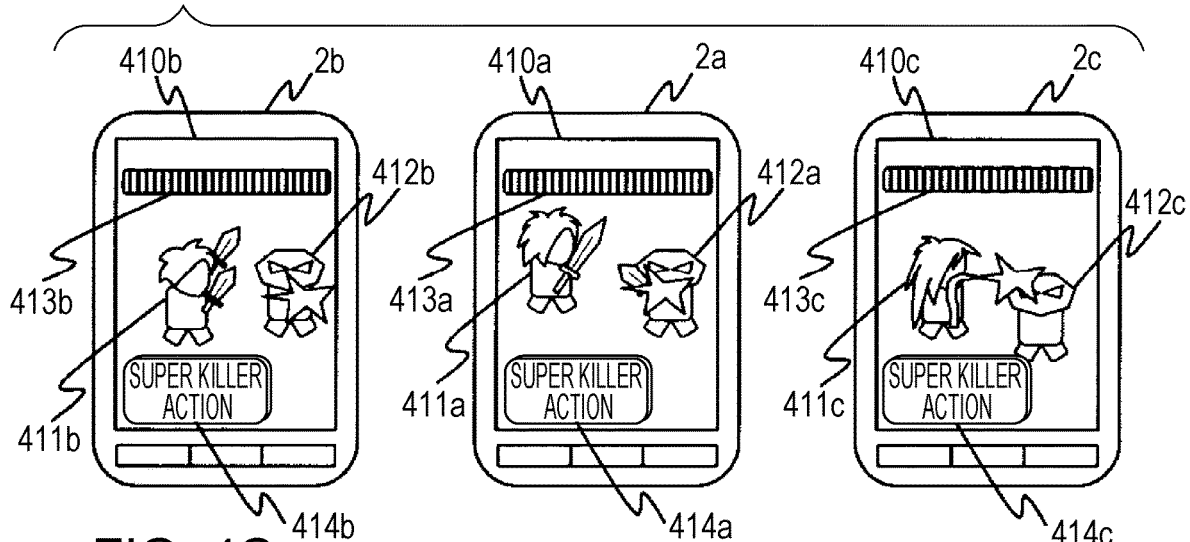
FIG. 4B illustrates an exemplary display screens of the battle game.

FIG. 4B illustrates examples of battle game screens 410a, 410b, and 410c that may be displayed in the mobile terminals 2a, 2b, and 2c, respectively. A battle game space within a certain range around an own character 411a may be displayed on the battle game screen 410a and battle game spaces within certain ranges around other characters 411b and 411c may be displayed on the battle game screens 410b and 410c, respectively. Enemy characters 412a, 412b, and 412c may be displayed on the battle game screens 410a, 410b, and 410c, respectively.

Gauges 413a, 413b, and 413c may have a maximum length on the battle game screens 410a, 410b, and 410c, respectively, unlike the battle game screens 400a, 400b, and 400c. This may indicate that the value of the accumulated points is greater than or equal to the predetermined point value (10 points); accordingly, special skill activation buttons 414a, 414b, and 414c may be displayed on the battle game screens 410a, 410b, and 410c, respectively. The special skill activation buttons 414a, 414b, and 414c may be buttons used to activate the special skills. According to an exemplary embodiment, only one of the own player A and the other players B and C may be capable of selecting the corresponding special skill activation button. Displaying the special skill activation buttons 414a, 414b, and 414c on the battle game screens 410a, 410b, and 410c of all of the own player A and the other players B and C, respectively, may thus allow each of the players on the team to have the right to activate the special skill.

Figure 4C:
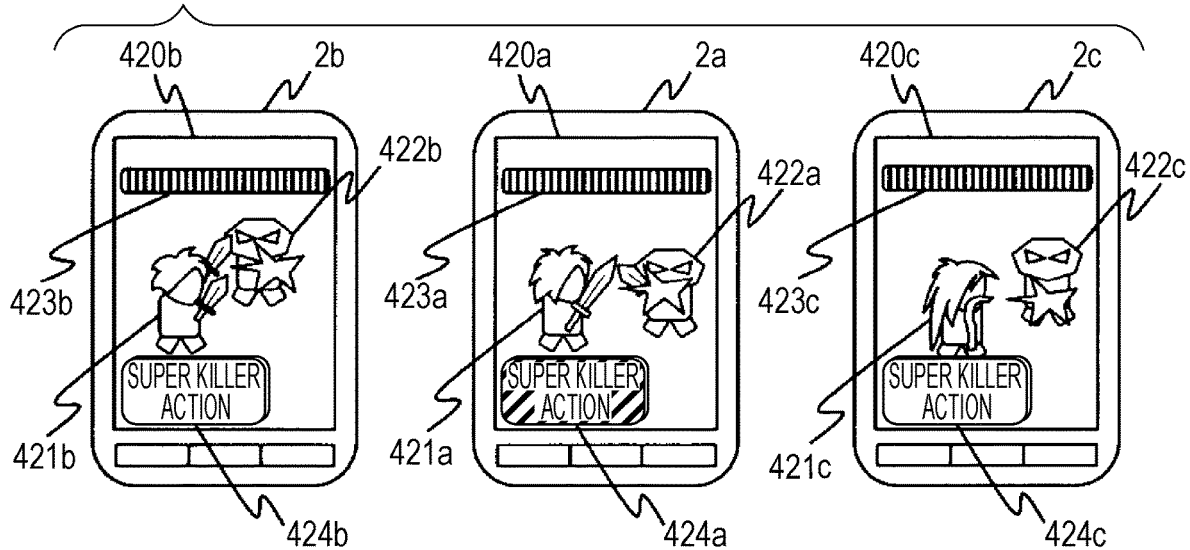
FIG. 4C illustrates an exemplary display screens of the battle game.

FIG. 4C illustrates examples of battle game screens 420a, 420b, and 420c that may be displayed on the mobile terminals 2a, 2b, and 2c, respectively. A battle game space within a certain range around an own character 421a, an enemy character 422a, a gauge 423a, and a special skill activation button 424a may all be displayed on the battle game screen 420a, and battle game spaces within certain ranges around other characters 421b and 421c, enemy characters 422b and 422c, gauges 423b and 423c, and special skill activation buttons 424b and 424c may be displayed on the battle game screens 420b and 420c, respectively, as on the battle game screens 410a, 410b, and 410c.

Upon first selection of the special skill activation button 424a by the own player A on the battle game screen 420a, the battle game screens 420a, 420b, and 420c may be changed to cooperation accepting period screens.

Figure 5A:
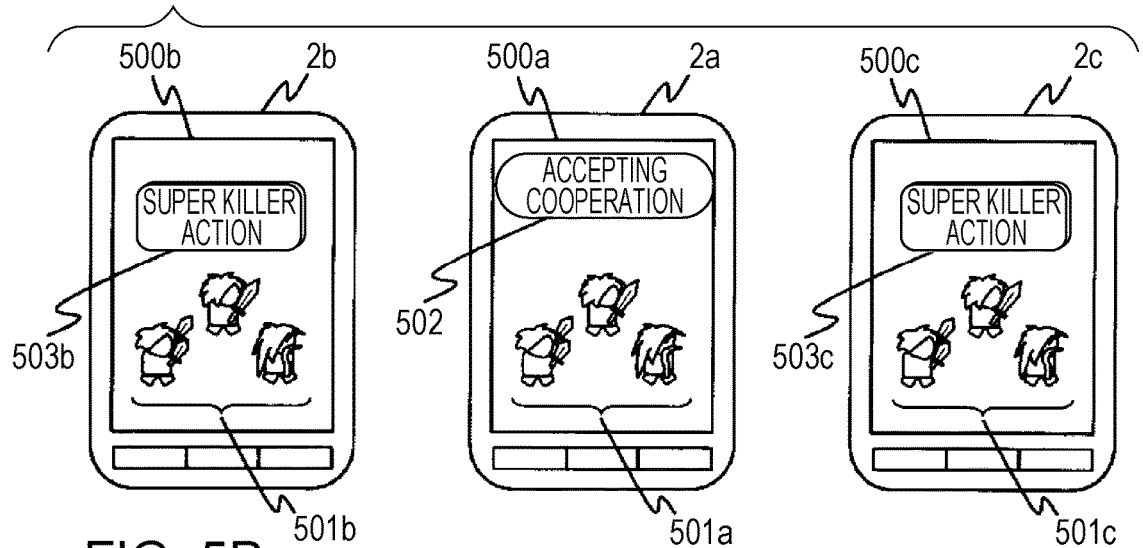
FIG. 5A illustrates an exemplary display screen of the battle game.

Turning now to exemplary FIG. 5A, FIG. 5A illustrates examples of cooperation accepting period screens 500a, 500b, 500c that may be displayed on the mobile terminals 2a, 2b, and 2c, respectively. A collection 501a of the own character and the other characters may be displayed on the cooperation accepting period screen 500a, a collection 501b of the own character and the other characters may be displayed on the cooperation accepting period screen 500b, and a collection 501c of the own character and the other characters may be displayed on the cooperation accepting period screen 500c. A wait-for-cooperation display image 502 indicating the cooperation accepting period may be displayed on the cooperation accepting period screen 500a of the mobile terminal 2a of the own player A, who is the activation player. A special skill activation button 503b may be displayed on the cooperation accepting period screen 500b of the mobile terminal 2b of the other player B, who is a cooperation player, and a special skill activation button 503c may be displayed on the cooperation accepting period screen 500c of the mobile terminal 2c of the other player C, who is another cooperation player.

According to an exemplary embodiment, the cooperation accepting period screens 500a, 500b, and 500c may be displayed only during the cooperation accepting period (for example, for five seconds) after the special skill activation button 424a has been first selected by the own player A. After the cooperation accepting period (for example, five seconds) has elapsed, the cooperation accepting period screens 500a, 500b, and 500c may be changed to special skill activation screens.

Figure 5B:
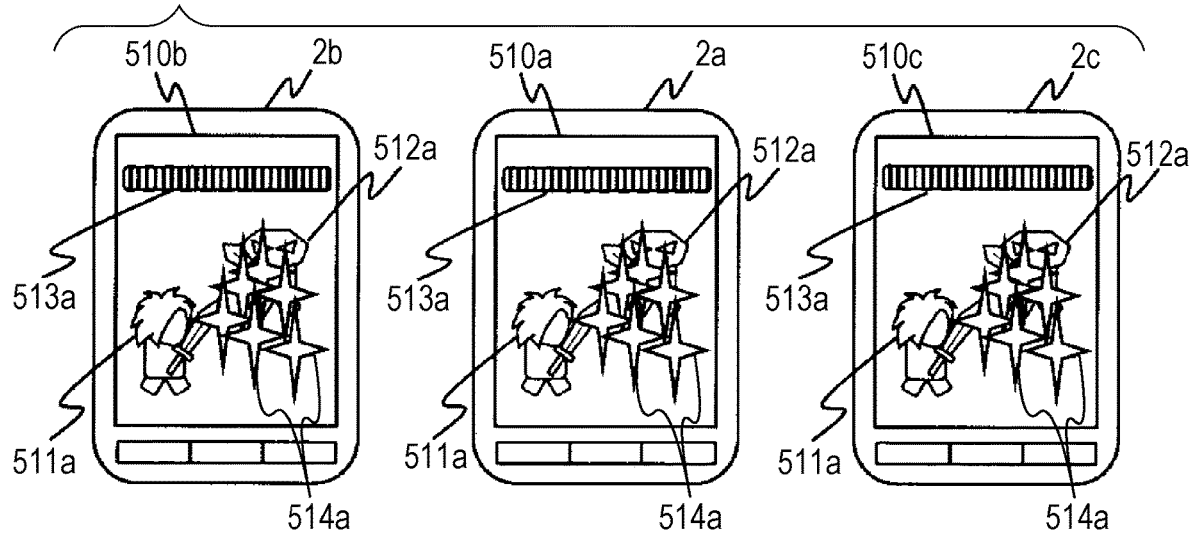
FIG. 5B illustrates an exemplary display screen of the battle game.

FIG. 5B illustrates examples of special skill activation screens 510a, 510b, and 510c that may be displayed in the mobile terminals 2a, 2b, and 2c, respectively. According to an exemplary embodiment, the special skill activation screens 510a, 510b, and 510c may be the same screen. An own character 511a of the own player A, who is the activation player, a battle game space within a certain range around the own character 511a, an enemy character 512a existing in the battle game space within the certain range, a gauge 513a, a special skill produced image 514a, and so on may all be displayed on the special skill activation screens 510a, 510b, and 510c. According to an exemplary embodiment, the special skill activation screens 510a, 510b, and 510c may display the special skill of the attack magic having an attack power greater than that of the normal skill of the attack magic, and may show this special skill being activated on the enemy character 512a.

The special skill activation screens 510a, 510b, and 510c may be displayed when the two other players B and C, who are the cooperation players, select the special skill activation buttons 503b and 503c, respectively, during the cooperation accepting period.

Figure 5C:
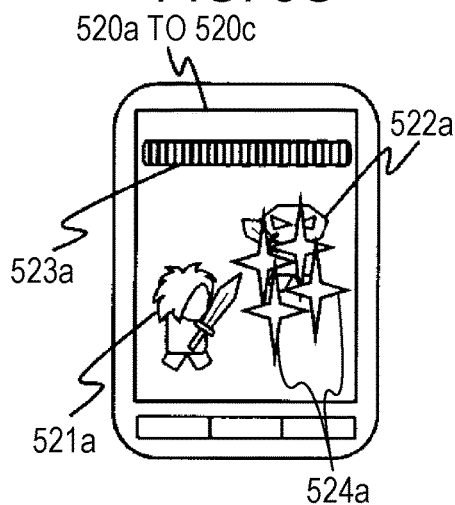
FIG. 5C illustrates an exemplary display screen of the battle game.
Figure 5D:
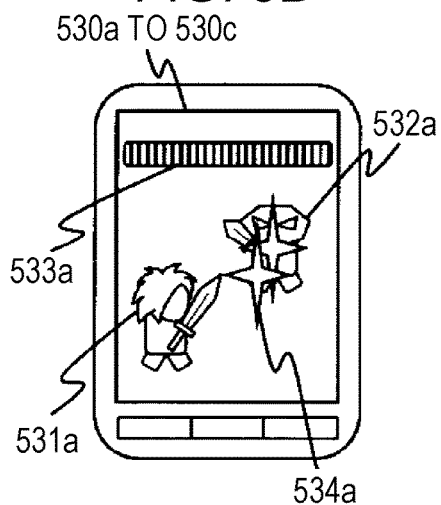
FIG. 5D illustrates an exemplary display screen of the battle game.

FIG. 5C illustrates an example of another special skill activation screen 520a, 520b, and 520c that may be displayed in the mobile terminals 2a, 2b, and 2c, respectively. Likewise, FIG. 5D illustrates an example of another special skill activation screen 530a, 530b, and 530c that may be displayed in the mobile terminals 2a, 2b, and 2c, respectively. In exemplary FIG. 5C, an own character 521a, an enemy character 522a, a gauge 523a, and a special skill produced image 524a may all be displayed on the other special skill activation screens 520a, 520b, and 520c, as on the special skill activation screens 510a, 510b, and 510c. Likewise, in exemplary FIG. 5D, an own character 531a, an enemy character 532a, a gauge 533a, and a special skill produced image 534a are displayed on the other special skill activation screens 530a, 530b, and 530c, as on the special skill activation screens 510a, 510b, and 510c.

In exemplary FIG. 5C, the special skill activation screens 520a, 520b, and 520c may be displayed when only any one of the other players B and C, who are the cooperation players, selects the special skill activation button 503b or 503c during the cooperation accepting period. In the exemplary embodiment of FIG. 5C, the magnitude of the special skill produced image 524a is smaller than that of the special skill produced image 514a. According to an exemplary embodiment, the time period during which the special skill produced image 524a is displayed may be shorter than the time period during which the special skill produced image 514a is displayed.

In exemplary FIG. 5D, the special skill activation screens 530a, 530b, and 530c may be displayed when none of the other players B and C, who are the cooperation players, selects the special skill activation buttons 503b and 503c during the cooperation accepting period. In this embodiment, the magnitude of the special skill produced image 534a may be smaller than that of the special skill produced image 524a. According to an exemplary embodiment, the time period during which the special skill produced image 534a is displayed may be shorter than the time period during which the special skill produced image 524a is displayed.

According to an exemplary embodiment, in order to realize the above functions, the terminal storage unit 22 may store, for example, an own-player table illustrated in FIG. 6A, an other-players table illustrated in FIG. 6B, an accumulated point table illustrated in FIG. 6C, and an activation cooperation table illustrated in FIG. 6D as various tables. In addition, the terminal storage unit 22 may store one or more kinds of battle game space data. The battle game space data may include, for example, data that defines a field in which each character is capable of moving, data used to draw trees, rocks, and structures (buildings, bridges, and so on), the images of the other characters, and the HPs, the MPs, and positions of the other characters. The terminal processing unit 25 may include the battle game execution portion 251, the accumulation portion 252, the cooperation portion 253, and the activation portion 254, as illustrated in FIG. 3. These portions are functional modules realized by the programs executed by the one or more processors in the terminal processing unit 25. These portions may be installed in the mobile terminal 2 as firmware.

Turning now to exemplary FIGS. 6A to 6D, the various tables illustrated in FIG. 6A to 6D and the functional modules in the terminal processing unit 25 illustrated in FIG. 3 will be sequentially described. Although the description will focus on the mobile terminal 2a of the own player A, the mobile terminals 2b and 2c of the other players B and C have the same functions as those of the mobile terminal 2a.

Turning now to exemplary FIG. 6A, FIG. 6A illustrates an example of the own-player table. The player ID, the name, the level, the HP, the MP, the position, an image, the occupation, the attribute, skills which the own player owns, killer actions which the own player owns, and so on of the own character may all be stored in association with each other in the own-player table. The position stored in the own-player table may indicate the position of the own character in the battle game space.

FIG. 6B illustrates an example of the other-players table. The player ID, the name, the level, the HP, the MP, the position, an image, and so on of each of the other characters are stored in association with each other in the other-players table.

FIG. 6C illustrates an example of the accumulated point table. The accumulated number of points corresponding to each skill when the skill was successfully used on an enemy character, and the time when the accumulated points have been stored, may be stored in association with each other in the accumulated point table.

FIG. 6D illustrates an example of the activation cooperation table. The player ID and the time of the activation player and the player ID(s) of the cooperation player(s) for the activation player may be stored in association with each other in the activation cooperation table. The time indicates the time when the activation player has selected the special skill activation button.

Turning back to exemplary FIG. 3, the function of certain portions of the terminal communication unit 21 may be described. According to an exemplary embodiment, the battle game execution portion 251 may control the start and execution of the battle game. At the start of the battle game, the battle game execution portion 251 may extract the player ID, the name, the level, the HP, the MP, and so on with reference to the own-player table and may transmit the variety of data that is extracted to the mobile terminals 2b and 2c of the other players B and C via the terminal communication unit 21, in the form of game control data. The battle game execution portion 251 may receive the game control data about each of the other characters from the mobile terminal 2b of the other player B and the mobile terminal 2c of the other player C via the terminal communication unit 21, and may store the variety of data included in the received game control data in the other-players table.

In addition, the battle game execution portion 251 may movably arrange the own character, the other characters, and the enemy character in the battle game space on the basis of the battle game space data, the own-player table, and the other-players table, which are stored in the terminal storage unit 22. Battle game execution portion 251 may also start the battle game. The battle game execution portion 251 may draw a battle space within a certain range around the own character and may superimpose the gauge corresponding to the accumulated points stored in the accumulated point table on the battle space to generate the display data. The battle game execution portion 251 may display the battle game screen in the display unit 24 on the basis of the generated display data.

Furthermore, the battle game execution portion 251 may control, for example, the action and the movement of the own character on the basis of the instruction data input by the own player with the operation unit 23 and updates the variety of data in the own-player table in accordance with the progress of the game. The battle game execution portion 251 may extract the variety of data with reference to the own-player table and may periodically transmit the extracted variety of data to the mobile terminals 2b and 2c of the other players B and C via the terminal communication unit 21 as the game control data.

Furthermore, the battle game execution portion 251 may periodically receive the game control data about the other characters from the mobile terminals 2b and 2c of the other players B and C via the terminal communication unit 21 and may store the variety of data included in the received game control data in the other-players table. The battle game execution portion 251 may periodically refer to the own-player table and the other-players table to reflect the content of the own-player table and the content of the other-players table in the own character and the other characters in the battle game space, thereby controlling the execution of the battle game.

According to an exemplary embodiment, the accumulation portion 252 may extract the latest accumulated point with reference to the accumulated point table, when the activation of the skill, such as the attack magic, is instructed by the own player with the operation unit 23 and the instructed skill has hit on the enemy character (the decrease in the HP associated with the enemy character succeeded). The accumulation portion may identify the point corresponding to the activated skill. The accumulation portion 252 may add the identified point to the extracted accumulated point to calculate the next latest accumulated point and may store the calculated accumulated point in the accumulated point table with the current time to update the accumulated point table. The accumulation portion 252 may store the accumulated point in the accumulated point table, may generate an accumulated point update instruction including the stored accumulated point or points and the time, and may transmit the accumulated point update instruction to the mobile terminals 2b and 2c of the other players B and C via the terminal communication unit 21.

In addition, upon reception of the accumulated point update instruction from the mobile terminal 2b or 2c of the other player B or C via the terminal communication unit 21, the accumulation portion 252 may store the accumulated point or points and the time included in the received accumulated point update instruction in the accumulated point table as the next latest accumulated point or points and the time.

Furthermore, the accumulation portion 252 may determine whether the accumulated point total stored in the accumulated point table is greater than or equal to a predetermined value (10 points). If the accumulated point total is greater than or equal to the predetermined value, the accumulation portion 252 may generate an activation preparation instruction. The accumulation portion 252 may transmit the activation preparation instruction to the mobile terminals 2b and 2c of the other players B and C via the terminal communication unit 21 and may pass the activation preparation instruction to the cooperation portion 253.

According to an exemplary embodiment, the cooperation portion 253 may display the battle game screen in which the special skill activation button is superimposed on the battle game space in the display unit 24 upon reception of the activation preparation instruction from the accumulation portion 252 or reception of the activation preparation instruction from the mobile terminal 2b or 2c of the other player B or C via the terminal communication unit 21. First, the cooperation portion 253 may draw the battle game space within a certain range around the own character, and may superimpose the gauge and the special skill activation button corresponding to the accumulated points stored in the accumulated point table on the battle game space, to generate the display data. Then, the cooperation portion 253 may display the battle game screen in the display unit 24 on the basis of the generated display data.

In addition, when the special skill activation button is selected by the own player A, the cooperation portion 253 may transmit an acceptance start instruction including the player ID of the own player and the time when the special skill activation button has been selected to the mobile terminals 2b and 2c of the other players B and C via the terminal communication unit 21. When the acceptance start instruction has been transmitted to the mobile terminals 2b and 2c, the cooperation portion 253 may store the player ID of the own player A in the activation cooperation table as an activation player ID, and may store the time when the special skill activation button has been selected in the activation cooperation table.

Furthermore, upon reception of the acceptance start instruction from the mobile terminal 2b or 2c of the other player B or C, the cooperation portion 253 may store the player ID of the other player included in the acceptance start instruction in the activation cooperation table as the activation player ID, and may store the time included in the acceptance start instruction in the activation cooperation table.

Furthermore, upon transmission of the acceptance start instruction to the mobile terminal 2b or 2c of the other player B or C, or reception of the acceptance start instruction from the mobile terminal 2b or 2c of the other player B or C via the terminal communication unit 21, the cooperation portion 253 may display the cooperation accepting period screen in the display unit 24.

Specifically, upon transmission of the acceptance start instruction to the mobile terminal 2b or 2c of the other player B or C, the cooperation portion 253 may generate the display data including the images of the own character and the other characters and the wait-for-cooperation display image indicating the cooperation accepting period. Upon reception of the acceptance start instruction from the mobile terminal 2b or 2c of the other player B or C, the cooperation portion 253 may generate the display data including the images of the own character and the other characters and the special skill activation button. Then, the cooperation portion 253 may display the cooperation accepting period screen in the display unit 24 only during the cooperation accepting period (for example, for five seconds) on the basis of the generated display data. The cooperation portion 253 may display the special skill activation button included in the cooperation accepting period screen during the cooperation accepting period so that the special skill activation button is moved. The cooperation portion 253 may vary the speed and/or direction of movement of the special skill activation button at random at arbitrary timing. According to an exemplary embodiment, this may improve the sense of entertainment derived from the game by introducing elements of a shooting game into the game.

According to an exemplary embodiment, upon selection of the special skill activation button by the own player A during the cooperation accepting period while the cooperation accepting period screen including the special skill activation button is being displayed, the cooperation portion 253 may store the player ID of the own player A as the cooperation player with reference to the activation cooperation table, and may transmit a cooperation instruction to the mobile terminals 2b and 2c of the other players B and C via the terminal communication unit 21. The own player A may be capable of selecting the special skill activation button up to a predetermined maximum number of times during the cooperation accepting period.

The cooperation portion 253 may extend the cooperation accepting period each time the special skill activation button included in the cooperation accepting period screen is selected by the cooperation player other than the activation player. For example, the cooperation portion 253 may extend the cooperation accepting period by five seconds from the time when the special skill activation button included in the cooperation accepting period screen has been selected by any of the cooperation players other than the activation player. This gives extra time to a cooperation player who is not capable of determining whether the cooperation is to be performed only during the cooperation accepting period. According to an exemplary embodiment, since the possibility of selection of the special skill activation button may be varied depending on the timing when the other cooperation players select the special skill activation button, one cooperation player may be capable of requesting a strategy from each cooperation player. This may encourage communication between the players.

According to an exemplary embodiment, upon reception of the cooperation instruction from the mobile terminal 2b or 2c of the other player B or C via the terminal communication unit 21 during the cooperation accepting period, the cooperation portion 253 may store the player IDs of the players who have transmitted the cooperation instruction in the activation cooperation table as the cooperation player IDs. The other players B and C may be capable of selecting the special skill activation button up to the predetermined maximum number of times during the cooperation accepting period. In this case, the cooperation portion 253 may store the player IDs of the other players B and C in the activation cooperation table as the cooperation player IDs of a number corresponding to the number of times of selection. In order to increase the effect of the special skill, each cooperation player may be required to perform, for example, an operation to tap the special skill activation button repeatedly during the cooperation accepting period. This may, for example, increase the sense of realism of the game. In this case, the selection times when the respective players have selected the special skill activation button may be stored and the effect of the special skill may be increased for each of the other players as the interval between the stored selection times is decreased and/or as each of the stored selection times is closer to each predetermined selection timing. This provides the battle game to which the fun of the timing game is added.

According to an exemplary embodiment, the activation portion 254 may vary the effect of the special skill depending on the number of the cooperation player IDs stored in the activation cooperation table, when the cooperation accepting period elapsed or the player IDs of all the cooperation players have been stored in the activation cooperation table as the cooperation player IDs, and activates the varied special skill. The activation portion 254 of the mobile terminal 2 of the activation player may transmit the display data used to display a battle game image immediately before the special skill activation button has been selected to the mobile terminals 2 of the players other than the activation player during the cooperation accepting period. This may allow the special skill activation screen including the character of the activation player, the battle game space within a certain range around the character, and the enemy character 512a existing in the battle game space within the certain range to be displayed also in the mobile terminals 2 of the players other than the activation player. The activation portion 254 may return the accumulated point stored in the accumulated point table to an initial value (zero) after the special skill is activated.

The cooperation portion 253 may calculate a difference period between the start time when the accumulation of the accumulated points in the accumulated point table is started and the time included in the acceptance start instruction. This difference period may be considered to be an "attained period," and the effect of the special skill may vary based on the length of the attained period.

For example, according to an exemplary embodiment, the effect of the special skill may be increased with a decreasing attained period, or the effect of the special skill may be increased based on the frequency with which each player activates a skill. In this case, a reward may be given to each player for active use of the skill. This may motivate increased activity of the player in the game.

According to an exemplary embodiment, the cooperation portion 253 may vary a display mode, such as the size of the special skill activation button included in the cooperation accepting period screen, depending on the attained period. For example, the cooperation portion 253 may increase the size of the special skill activation button included in the cooperation accepting period screen when the attained period is very small. This allows, for example, a selection error of the special skill activation button to be prevented.

According to an exemplary embodiment, a display mode may move the special skill activation button while it is displayed, and the cooperation portion 253 may vary the speed of the movement of the special skill activation button depending on the attained period. For example, the cooperation portion 253 may decrease the speed of movement of the special skill activation button included in the cooperation accepting period screen with the decreasing attained period. This may make the special skill activation button easier to select with a decreasing attained period.

According to an exemplary embodiment, the start time when the accumulation of accumulated points in the accumulated point table has been started may be considered to be the latest of several times; specifically, it may be the later of the start time when the battle game has been started by the battle game execution portion 251 and the time when the battle game screen has been re-displayed in response to activation of the special skill by the activation portion 254. According to an exemplary embodiment, when the special skill has been activated by the activation portion 254 multiple times, the latest time when the special skill has been activated may be adopted.

According to an exemplary embodiment, the cooperation portion 253 may store the selection times when the respective cooperation players have selected the special skill activation button included in the cooperation accepting period screen during the cooperation accepting period, and may increase the effect of the special skill as the interval between the selection times of the respective cooperation player is decreased. When three or more cooperation players exist, the cooperation portion 253 may increase the effect of the special skill as the average of the differences between the selection times of the respective cooperation players is decreased. This may have the effect of increasing the effect of the special skill as the interval of cooperation between the cooperation players is shortened, thereby providing an additional timing game that can increase the fun of players playing the battle game. According to another exemplary embodiment, the cooperation portion 253 may increase the effect of the special skill when the multiple cooperation players have selected the special skill activation button in a predetermined order (for example, in ascending order of the levels of the characters of the cooperation players). In this case, it is possible to give a sense of exhilaration, as in a combo play, to each player to improve the motivation of selection of the special skill activation button of each cooperation player.

Figure 7:
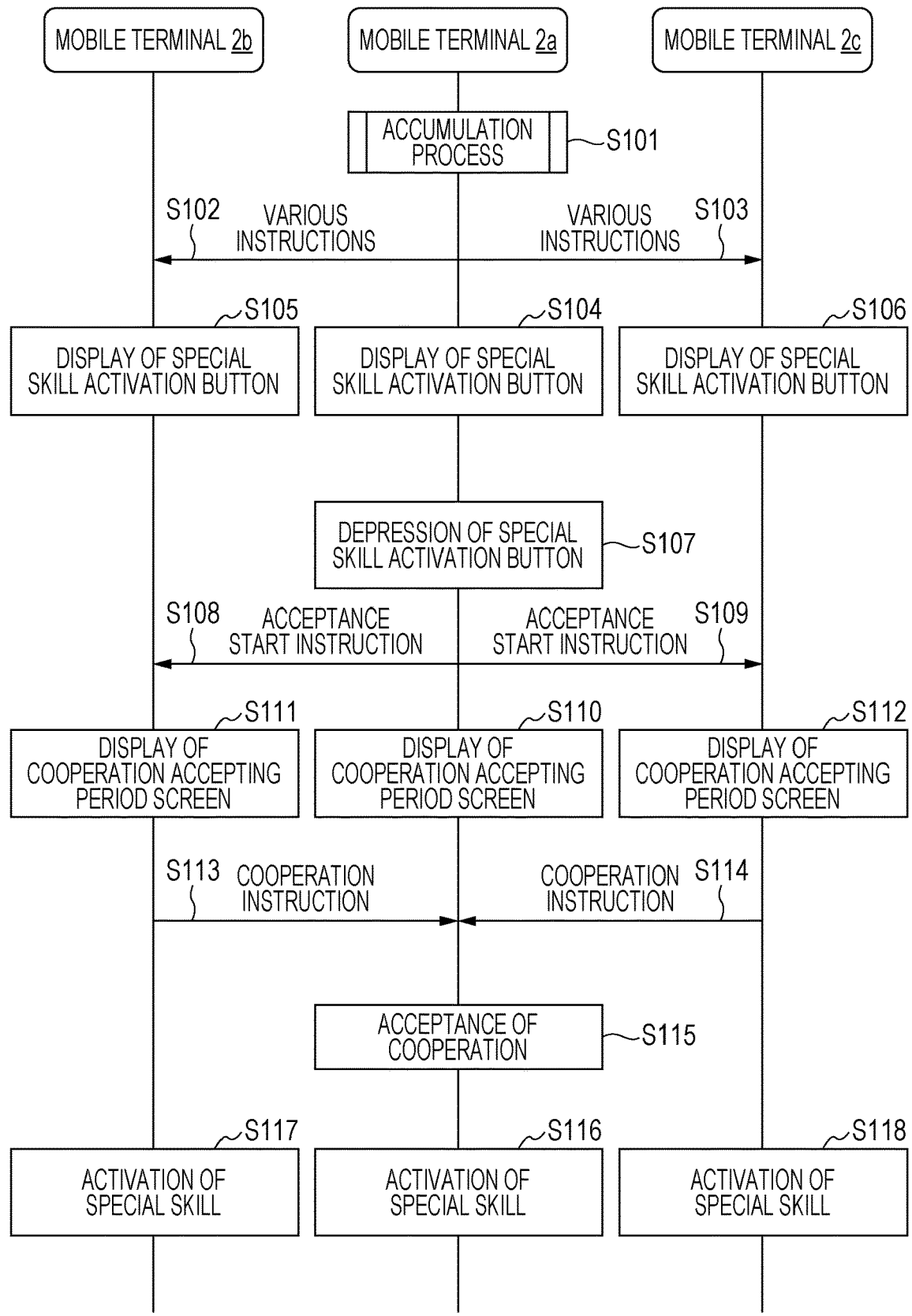
FIG. 7 illustrates an exemplary operating sequence in the game system.

Turning now to exemplary FIG. 7, FIG. 7 illustrates an exemplary operating sequence in the game system 1. This operating sequence may be performed on the basis of the programs stored in the terminal storage unit 22 in advance mainly in cooperation with each element in the terminal processing unit 25.

The operating sequence in the game system 1 illustrated in FIG. 7 will now be described.

Referring to FIG. 7, in Step S101, the accumulation portion 252 in the mobile terminal 2a of the own player A may periodically perform an accumulation process while the battle game is being executed by the battle game execution portion 251. The process of executing the battle will be described below. The accumulation process may also be periodically performed in the accumulation portion 252 in the mobile terminal 2b of the other player B and the accumulation portion 252 in the mobile terminal 2c of the other player C.

In Step S102, the accumulation portion 252 in the mobile terminal 2a may transmit the accumulated point update instruction or the activation preparation instruction generated in the accumulation process to the mobile terminal 2b of the other player B via the terminal communication unit 21. In Step S103, the accumulation portion 252 in the mobile terminal 2a may transmit the accumulated point update instruction or the activation preparation instruction to the mobile terminal 2c of the other player C via the terminal communication unit 21. The accumulation portion 252 in the mobile terminal 2a may pass the activation preparation instruction to the cooperation portion 253 in the transmission of the activation preparation instruction to the mobile terminals 2b and 2c. Also in the accumulation portion 252 in the mobile terminal 2b of the other player B and the accumulation portion 252 in the mobile terminal 2c of the other player C, the accumulated point update instruction or the activation preparation instruction generated in the accumulation process may be transmitted to the other mobile terminals via the terminal communication unit 21 each time the accumulation process is performed.

In Step S104, upon reception of the activation preparation instruction from the accumulation portion 252 in the mobile terminal 2a, the cooperation portion 253 in the mobile terminal 2a may display the battle game screen on which the special skill activation button is superimposed in the display unit 24 in the mobile terminal 2a. Simultaneously, in Step S105, upon reception of the activation preparation instruction from the mobile terminal 2a via the terminal communication unit 21, the cooperation portion 253 in the mobile terminal 2b may display the battle game screen on which the special skill activation button is superimposed in the display unit 24 in the mobile terminal 2b. Simultaneously, in Step S106, upon reception of the activation preparation instruction from the mobile terminal 2a via the terminal communication unit 21, the cooperation portion 253 in the mobile terminal 2c may display the battle game screen on which the special skill activation button is superimposed in the display unit 24 in the mobile terminal 2c.

When the special skill activation button displayed in the display unit 24 in the mobile terminal 2a is selected by the own player A in Step S107, in Step S108, the cooperation portion 253 in the mobile terminal 2a may transmit the acceptance start instruction to the mobile terminal 2b via the terminal communication unit 21. Simultaneously, in Step S109, the cooperation portion 253 in the mobile terminal 2a may transmit the acceptance start instruction to the mobile terminal 2c via the terminal communication unit 21. Also, when either of the other player B and the other player C has selected the special skill activation button displayed in the display unit 24 in the mobile terminal 2b or 2c, the acceptance start instruction may be transmitted to the mobile terminals 2 of the players other than the other player who has selected the special skill activation button.

Upon transmission of the acceptance start instruction to the mobile terminals 2b and 2c, in Step S110, the cooperation portion 253 in the mobile terminal 2a may display the cooperation accepting period screen including the wait-for-cooperation display image indicating the cooperation accepting period in the display unit 24 in the mobile terminal 2a. Simultaneously, upon reception of the acceptance start instruction from the mobile terminal 2a via the terminal communication unit 21, in Step S111, the cooperation portion 253 in the mobile terminal 2b may display the cooperation accepting period screen including the special skill activation button in the display unit 24 in the mobile terminal 2b. Simultaneously, upon reception of the acceptance start instruction from the mobile terminal 2a via the terminal communication unit 21, in Step S112, the cooperation portion 253 in the mobile terminal 2c may display the cooperation accepting period screen including the special skill activation button in the display unit 24 in the mobile terminal 2c.

When the own player B selects the special skill activation button during the cooperation accepting period while the cooperation accepting period screen including the special skill activation button is being displayed, the cooperation portion 253 in the mobile terminal 2b may store the player ID of the own player B in the activation cooperation table as the cooperation player and, in Step S113, the cooperation portion 253 in the mobile terminal 2b may transmit the cooperation instruction to the mobile terminal 2a via the terminal communication unit 21. When the own player C selects the special skill activation button during the cooperation accepting period while the cooperation accepting period screen including the special skill activation button is being displayed, the cooperation portion 253 in the mobile terminal 2c may store the player ID of the own player C in the activation cooperation table as the cooperation player and, in Step S114, the cooperation portion 253 in the mobile terminal 2c may transmit the cooperation instruction to the mobile terminal 2a via the terminal communication unit 21.

Upon reception of the cooperation instruction from the mobile terminal 2b or 2c of the other player B or C via the terminal communication unit 21 during the cooperation accepting period while the cooperation accepting period screen including the wait-for-cooperation display image is being displayed, in Step S115, the cooperation portion 253 in the mobile terminal 2a may store the player ID of the player who has transmitted the cooperation instruction as the cooperation player ID with reference to the activation cooperation table.

According to an exemplary embodiment, when the cooperation accepting period has elapsed, or when the player IDs of all the players other than the activation player are stored in the activation cooperation table as the cooperation player IDs, in Step S116, the activation portion 254 in the mobile terminal 2a may vary the effect of the special skill in accordance with the number of the cooperation player IDs stored in the activation cooperation table, and may activate the varied special skill. Simultaneously, when the cooperation accepting period elapses or the player IDs of all the players other than the activation player are stored in the activation cooperation table as the cooperation player IDs, in Step S117, according to an exemplary embodiment, the activation portion 254 in the mobile terminal 2b may vary the effect of the special skill in accordance with the number of the cooperation player IDs stored in the activation cooperation table, and may activate the varied special skill. Simultaneously, when the cooperation accepting period elapses or the player IDs of all the players other than the activation player are stored in the activation cooperation table as the cooperation player IDs, in Step S118, according to an exemplary embodiment, the activation portion 254 in the mobile terminal 2c may vary the effect of the special skill in accordance with the number of the cooperation player IDs stored in the activation cooperation table, and may activate the varied special skill.

Figure 8:
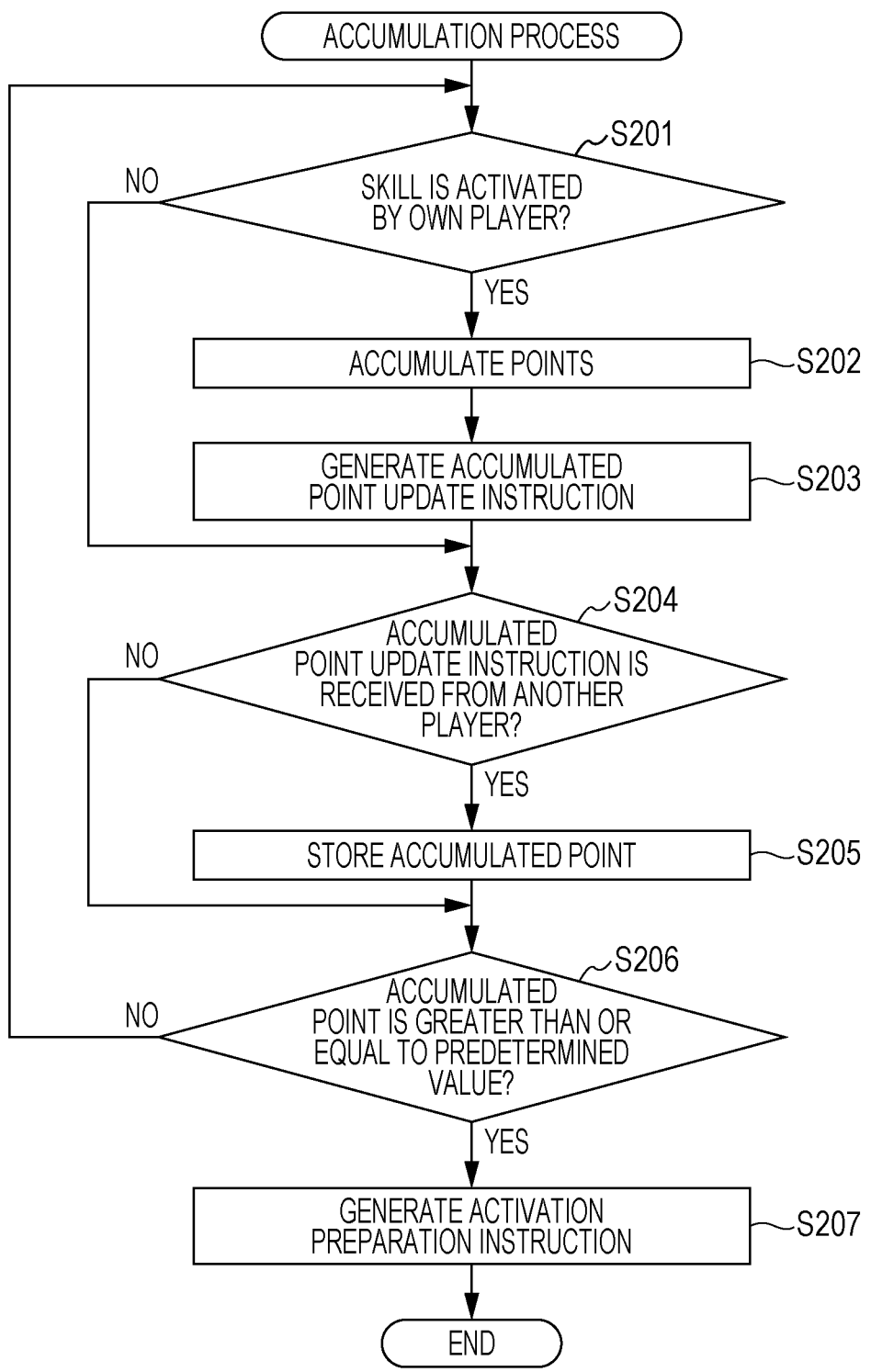
FIG. 8 is an exemplary flowchart of an accumulation process.

Turning now to exemplary FIG. 8, FIG. 8 is an exemplary flowchart of the accumulation process by the accumulation portion 252. The accumulation process illustrated in FIG. 8 may be performed in Step S101 in FIG. 7.

Referring to FIG. 8, in Step S201, the accumulation portion 252 may determine whether the skill activated by the own player with the operation unit 23 has hit on the enemy character (whether the decrease in the HP associated with the enemy character succeeded).

According to an exemplary embodiment, if the accumulation portion 252 determines that the activated skill has hit on the enemy character (YES in Step S201), in Step S202, the accumulation portion 252 may determine the points corresponding to the activated skill, and may store the accumulated points. If the accumulation portion 252 determines that the activated skill has not hit on the enemy character (NO in Step S201), the process goes to Step S204 described below.

In Step S203, the accumulation portion 252 may generate the accumulated point update instruction including the stored accumulated point and the time.

In Step S204, the accumulation portion 252 may determine whether the accumulated point update instruction has been received from the mobile terminal of the other player via the terminal communication unit 21. If the accumulation portion 252 determines that the accumulated point update instruction has been received from the mobile terminal of the other player (YES in Step S204), in Step S205, the accumulation portion 252 may store the received accumulated point and the time. If the accumulation portion 252 determines that the accumulated point update instruction has not been received from the mobile terminal of the other player (NO in Step S204), the process may go to Step S206 described below.

In step S206, the accumulation portion 252 may determine whether the accumulated point value stored in the accumulated point table is greater than or equal to a predetermined value (10 points).

If the accumulation portion 252 determines that the accumulated point value is greater than or equal to the predetermined value (10 points) (YES in Step S206), in Step S207, the accumulation portion 252 generates an activation preparation instruction. Then, the accumulation process in FIG. 8 is terminated. If the accumulation portion 252 determines that the accumulated point is not greater than nor equal to the predetermined value (10 points) (NO in Step S206), the process may go back to Step S201.

As described above, according to an exemplary embodiment of the game system 1, when the special skill activation button has been selected by the own player A, the special skill having an effect corresponding to the number of times the special skill activation button has been selected by the other players B and C, is activated. Accordingly, the game system 1 in the present embodiment may be capable of reflecting the intentions of cooperation or agreement of the other players in the effect of the special, thereby improving the sense of entertainment of the battle game.

In the game system 1 in the present embodiment, a specific terminal, among the multiple mobile terminals 2, may function as a host. The mobile terminal 2 functioning as the host is hereinafter referred to as a host terminal and the mobile terminals other than the host terminal are hereinafter referred to as client terminals. In this case, the host terminal may manage the accumulated point table and the activation cooperation table, and the client terminals may not manage the accumulated point table and the activation cooperation table. Each client terminal may not include the accumulation portion 252 and, each time the activated skill hits on the enemy character, may instead transmit the point corresponding to the skill to the host terminal. The accumulation portion 252 in the host terminal may accumulate and store these points. The host terminal may periodically transmit the accumulated point stored in the accumulated point table to the client terminals and the cooperation portion 253 in each client terminal may generate the display data including the gauge corresponding to the accumulated point received from the host terminal. In addition, the cooperation portion 253 in each client terminal may transmit the acceptance start instruction only to the host terminal when the special skill activation button has been selected. The host terminal may transmit the acceptance start instruction to all the client terminals. The cooperation portion 253 in each client terminal may transmit the cooperation instruction only to the host terminal. When the cooperation accepting period has elapsed or the player IDs of all the cooperation players are stored in the activation cooperation table as the cooperation player IDs, the activation portion 254 in the host terminal may transmit the number of the cooperation player IDs stored in the activation cooperation table and the display data used to display the battle game image immediately before the special skill activation button has been selected in the mobile terminal 2 of the activation player to all the client terminals. The activation portion 254 in each client terminal may display the special skill activation screen on the basis of the received number of the cooperation player IDs and the display data used to display the battle game image. Causing the multiple mobile terminals 2 to function as the host terminal and the client terminals may help to prevent loss of data or inconsistency of data between the mobile terminals. According to an exemplary embodiment, the host terminal may manage not only the accumulated point table and the activation cooperation table but also all the tables involved in the progress of the game, the battle game space data, and so on. According to another exemplary embodiment, a server apparatus may be caused to have the function of the host terminal. In this case, the mobile terminal 2 may communicate with the server apparatus to receive the data in the various tables and the battle game space data and may transmit the data that is generated or updated along with the progress of the game to the server apparatus, thereby advancing the game.

According to an exemplary embodiment, an instruction to input the skill may be accepted on the basis of position specification in a specific area on the display screen.

A process of instructing input of the skill, when a pointing device such as a touch panel is used as the operation unit 23 in the mobile terminal 2, will now be described.

Figure 9A:
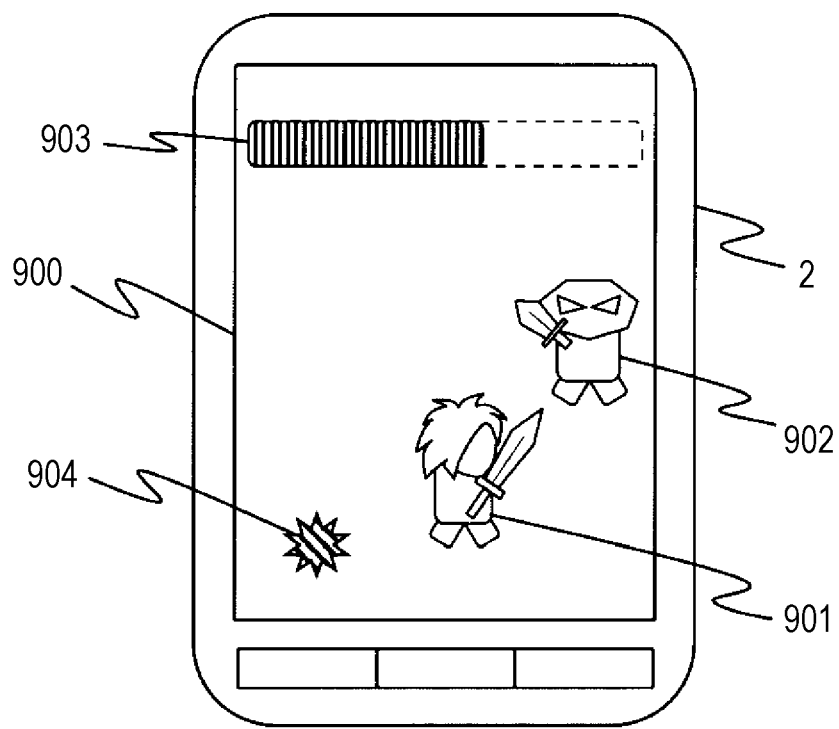
FIG. 9A is a schematic diagram providing an example of an input instruction.
Figure 9B:
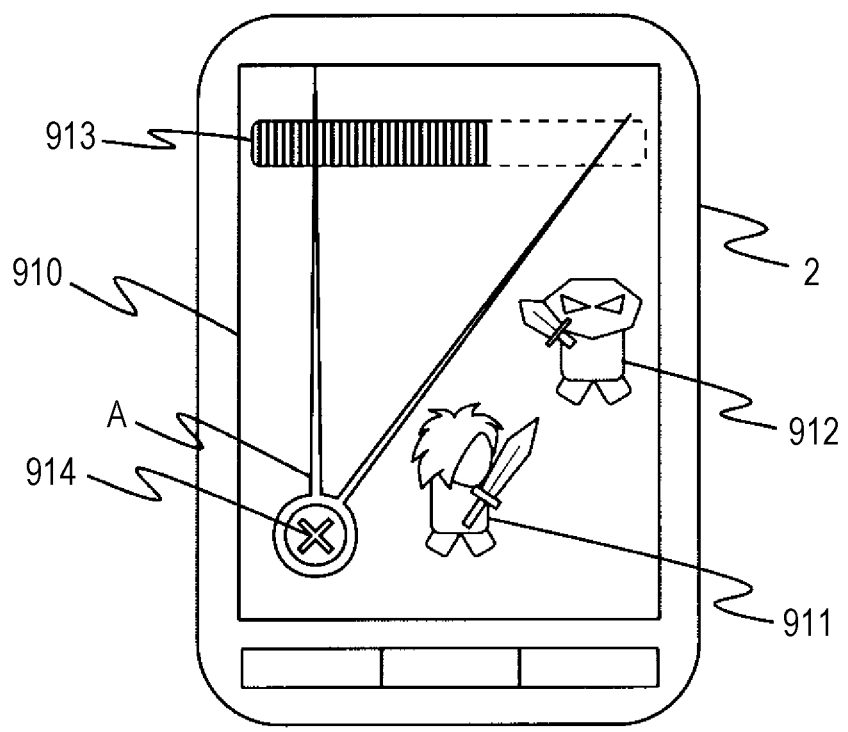
FIG. 9B is a schematic diagram providing an example of an input instruction.

Turning now to exemplary FIGS. 9A and 9B, FIGS. 9A and 9B are schematic diagrams for describing an example of the instruction to input the skill, which is based on the position specification in a specific area on the display screen. Although the player who operates the mobile terminal 2 is referred to as the own player in the following description for convenience, the same processing is performed also in the mobile terminals 2 operated by the other players.

FIG. 9A illustrates an example of a battle game screen 900 displayed in the mobile terminal 2.

Referring to FIG. 9A, an own character 901, a battle game space within a certain range around the own character 901, an enemy character 902 existing in the battle game space within the certain range, a gauge 903, and so on may be displayed on the battle game screen 900.

When the own player taps on one point on the battle game screen 900 of the mobile terminal 2 with his/her finger or the like, the one point on the battle game screen 900 specified with the tapping operation may be identified as a specified position 904. The specified position 904 may be an example of a first position.

FIG. 9B illustrates an example of a battle game screen 910 after the tapping operation.

Referring to FIG. 9B, an own character 911, a battle game space within a certain range around the own character 911, an enemy character 912 existing in the battle game space within the certain range, a gauge 913, and so on may be displayed on the battle game screen 910, as on the battle game screen 900 in FIG. 9A. A guide graphic A based on a specified position 914 may be displayed on the battle game screen 910 only during a certain period (for example, for three seconds). The specified position 914 may be the same position as the specified position 904 in FIG. 9A.

Figure 10A:
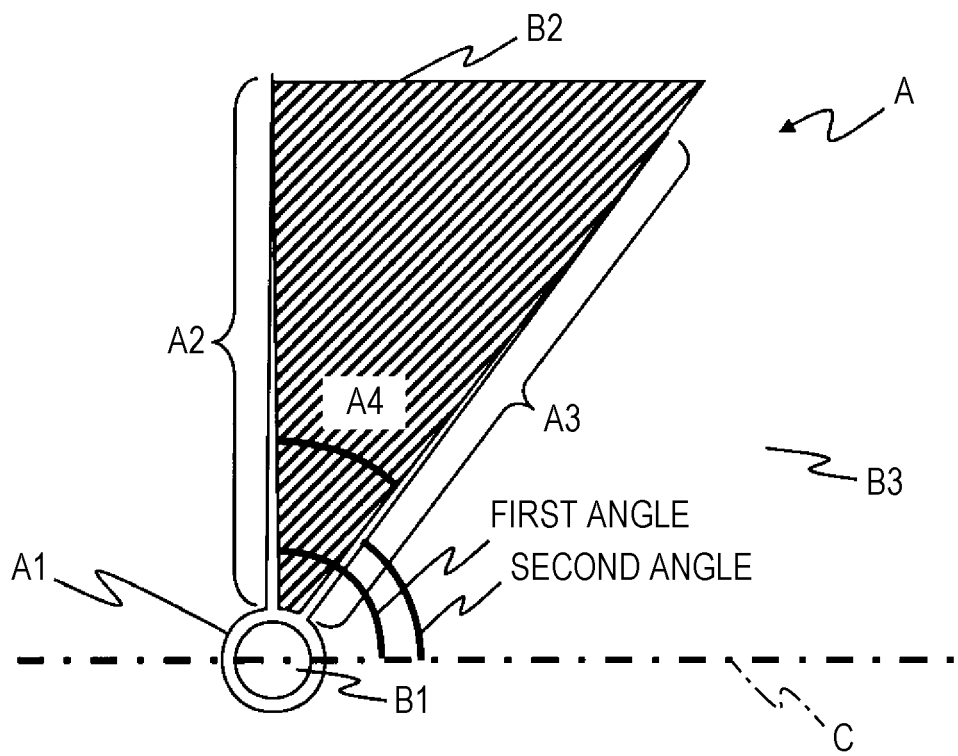
FIG. 10A is a schematic diagram for describing an exemplary guide graphic.

FIG. 10A is a schematic diagram for describing an example of the guide graphic A.

Referring to FIG. 10A, the guide graphic A may be composed of a circular graphic A1 defining an circular area B1 around the specified position, a first line graphic A2 positioned on a first straight line through the specified position, and a second line graphic A3 positioned on a second straight line through the specified position. The first straight line from the specified position may form a first angle with a certain axis C and the second straight line from the specified position may form a second angle with the certain axis C. An angle A4 may be an angle between the first straight line and the second straight line with an apex of the specified position (a difference angle between the first angle and the second angle). The angle A4 may be an example of a certain angle.

The battle game screen 900 may be divided into the circular area B1, a first angle area B2, and a second angle area B3 with the circular graphic A1, the first line graphic A2, and the second line graphic A3. The first angle area B2 is an area having the angle A4 and the second angle area B3 is an area excluding the circular area B1 and the first angle area B2.

Figure 10B:
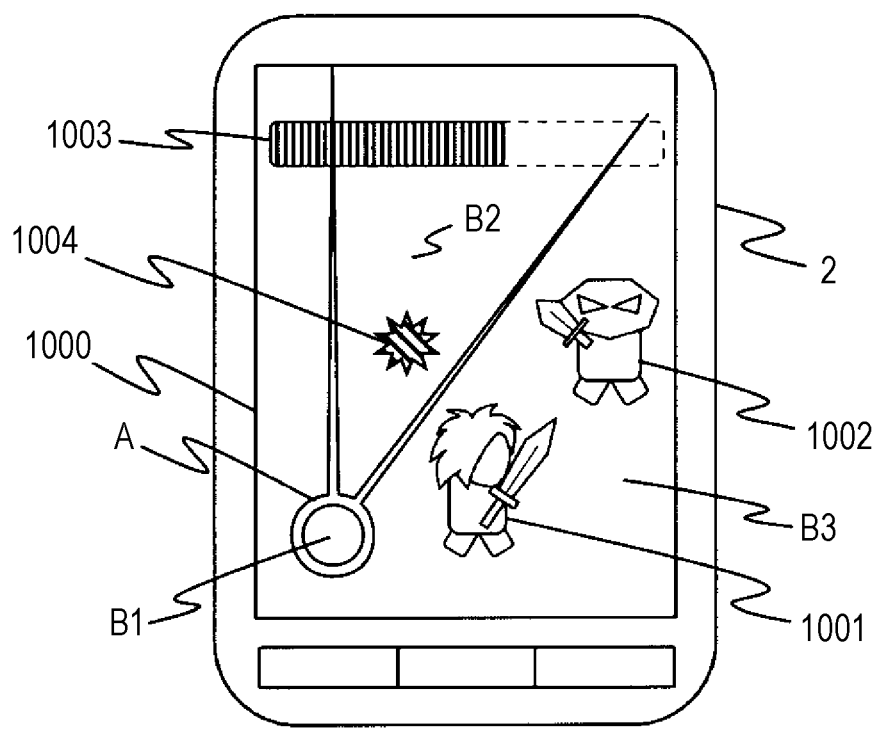
FIG. 10B illustrates an exemplary battle game screen.

FIG. 10B illustrates an example of a battle game screen 1000, which is tapped on while the guide graphic A is being displayed.

Referring to FIG. 10B, an own character 1001, a battle game space within a certain range around the own character 1001, an enemy character 1002 existing in the battle game space within the certain range, a gauge 1003, and the guide graphic A may be displayed on the battle game screen 1000, as on the battle game screen 910 illustrated in FIG. 9B.

The battle game screen 1000 may be divided into the circular area B1, the first angle area B2, and the second angle area B3 with the guide graphic A. Instructions to input different actions may be associated with the circular area B1, the first angle area B2, and the second angle area B3. For example, an instruction to input the attack may be associated with the circular area B1, an instruction to input the skill activation may be associated with the first angle area B2, and an instruction to input the defense may be associated with the second angle area B3.

When the own player taps on any of the circular area B1, the first angle area B2, and the second angle area B3 while the guide graphic A is being displayed, input of the action associated with the area including a specified position 1004 on the battle game screen 1000, which is specified with the tapping operation, may be conveyed as an instruction, and the action input conveyed in the instruction may be performed. Since the specified position 1004 is included in the first angle area B2 in the example illustrated in FIG. 10B, input of the skill activation associated with the first angle area B2 may be conveyed as an instruction. The specified position 1004 is an example of a second position. As described above, since input of the skill activation is conveyed as an instruction on the basis of the relative relationship between the first position (for example, the specified position 904 in FIG. 9A) and the second position (for example, the specified position 1004 in FIG. 10B), it is possible to activate the skill with an intuitive and simple operation.

Figure 11:
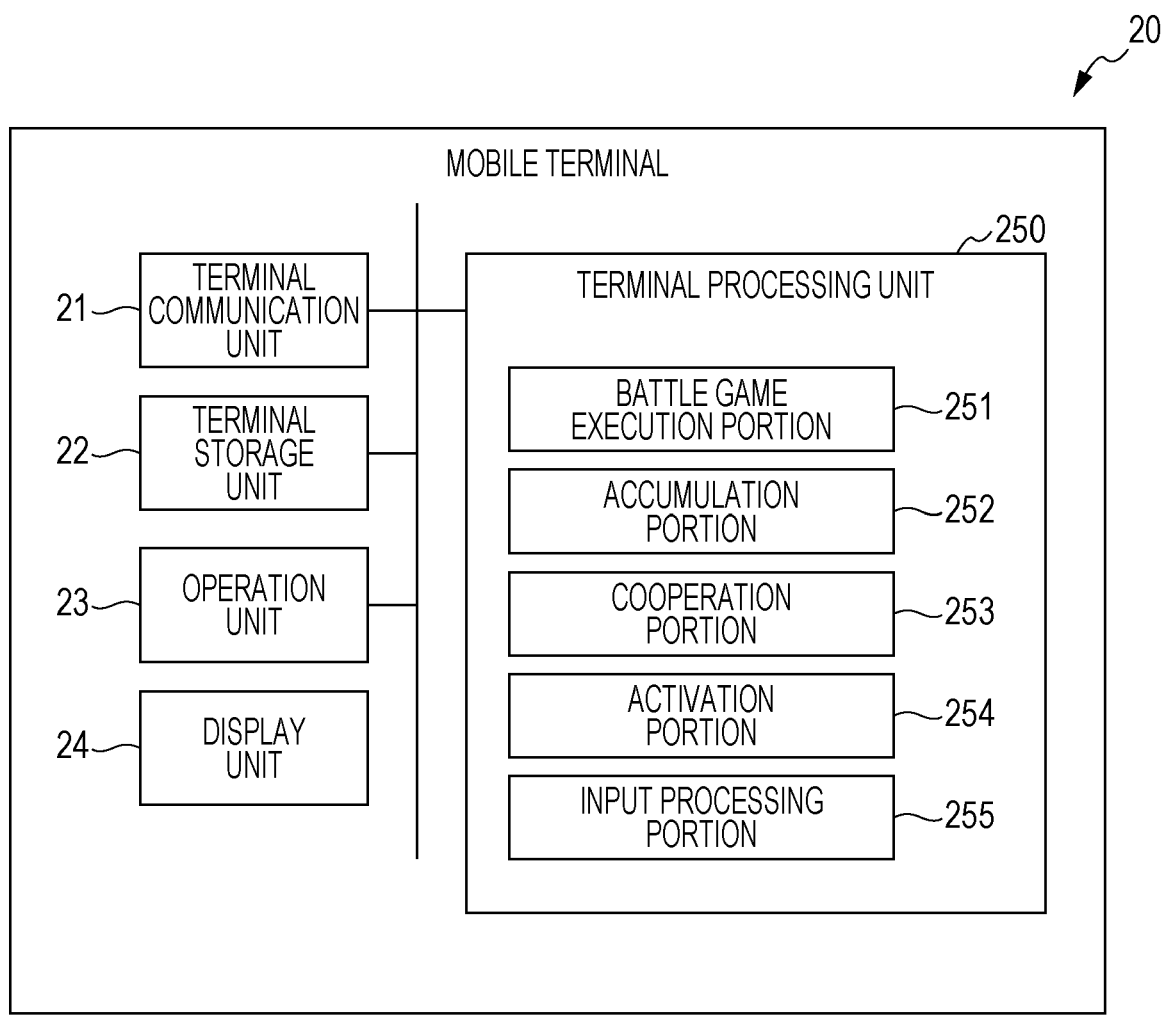
FIG. 11 illustrates an exemplary schematic configuration of another mobile terminal.

Turning now to exemplary FIG. 11, FIG. 11 illustrates an exemplary schematic configuration of a mobile terminal 20, which instructs input of the skill on the basis of the position specification. The same reference numerals are used in FIG. 11 to identify the same components in the mobile terminal 2 illustrated in FIG. 3. A description of such components is omitted herein.

Referring to FIG. 11, the mobile terminal 20 may include the terminal communication unit 21, the terminal storage unit 22, the operation unit 23, the display unit 24, and a terminal processing unit 250. The terminal processing unit 250 may at least include the battle game execution portion 251, the accumulation portion 252, the cooperation portion 253, the activation portion 254, and an input processing portion 255. The function of the input processing portion 255 will now be described. According to an exemplary embodiment, the battle game execution portion 251, the accumulation portion 252, the cooperation portion 253, and the activation portion 254 may be the same as those illustrated in FIG. 3; as such, a detailed description of the battle game execution portion 251, the accumulation portion 252, the cooperation portion 253, and the activation portion 254 is omitted herein.

In response to a tapping operation by the own player with the operation unit 23 composed of a pointing device, such as a touch panel, the input processing portion 255 may identify the specified position on the battle game screen specified with the tapping operation and may perform the action based on the identified specified position.

Figure 12:
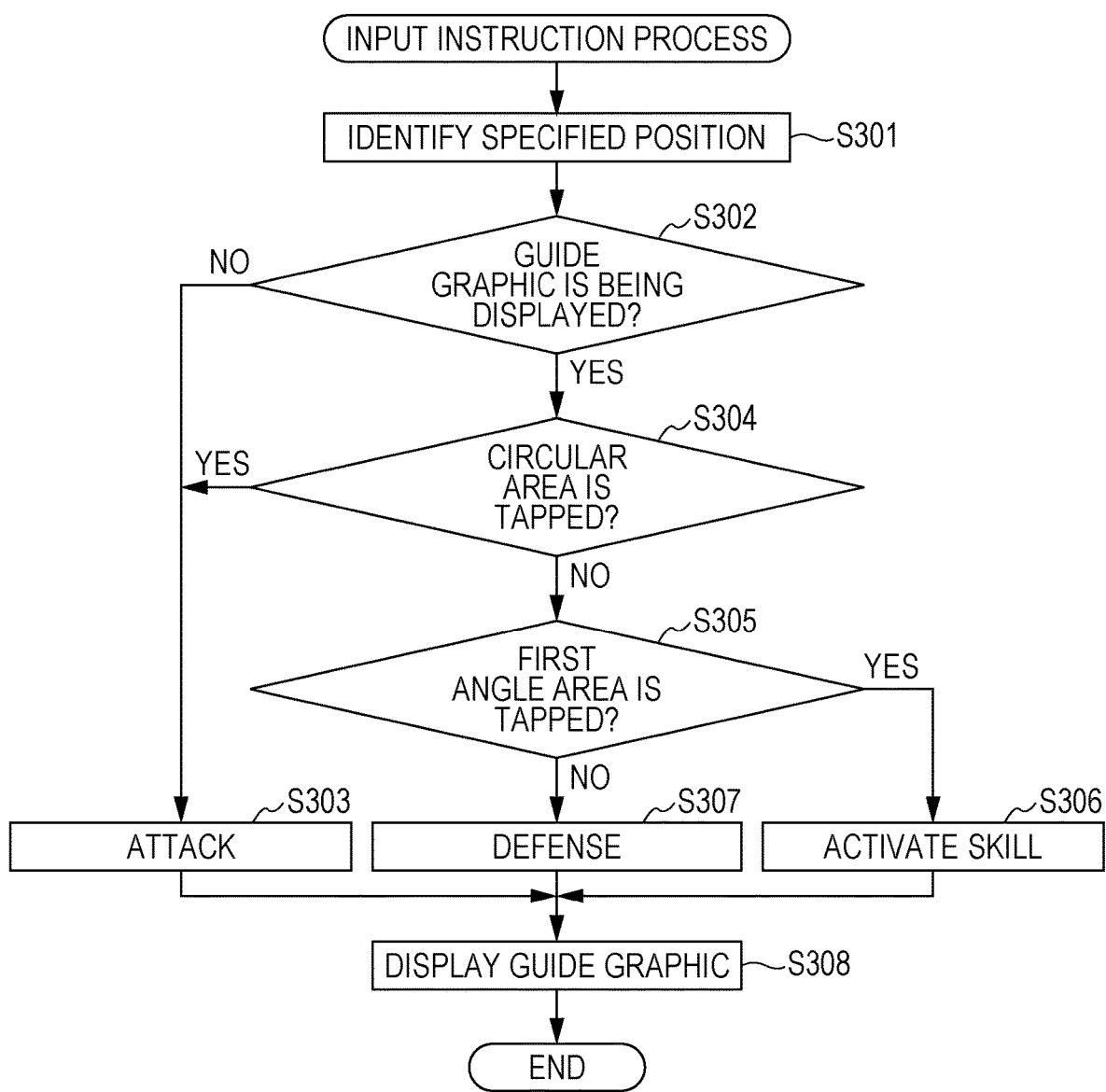
FIG. 12 is an exemplary flowchart of an input instruction process.

FIG. 12 is an exemplary flowchart of an input instruction process by the input processing portion 255.

Referring to FIG. 12, in Step S301, the input processing portion 255 may identify the specified position on the battle game screen, which may be specified by the tapping operation of the own player with the operation unit 23. In Step S302, the input processing portion 255 may determine whether a guide graphic is being displayed on the battle game screen.

If the input processing portion 255 determines that no guide graphic is being displayed on the battle game screen (NO in Step S302), in Step S303, the input processing portion 255 may select the attack as the action of the own character and may perform the attack. Then, the process goes to Step S308.

If the input processing portion 255 determines that a guide graphic is being displayed on the battle game screen (YES in Step S302), in Step S304, the input processing portion 255 may determine whether the specified position identified in Step S301 is included in the circular area.

If the input processing portion 255 determines that the specified position is included in the circular area (YES in Step S304), the process may go to Step S303. If the input processing portion 255 determines that the specified position is not included in the circular area (NO in Step S304), in Step S305, the input processing portion 255 may determine whether the specified position identified in Step S301 is included in the first angle area.

If the input processing portion 255 determines that the specified position is included in the first angle area (YES in Step S305), in Step S306, the input processing portion 255 may select the skill activation as the action of the own character. Then, the process may go to Step S308. If the input processing portion 255 determines that the specified position is not included in the first angle area (NO in Step S305), in Step S307, the input processing portion 255 may select the defense as the action of the own character. Then, the process goes to Step S308.

Then, the input processing portion 255 may delete the guide graphic when the guide graphic is being displayed. In Step S308, the input processing portion 255 may create a guide graphic based on the specified position identified in Step S301 and may display the created guide graphic on the battle game screen. Then, the process illustrated in FIG. 12 may be terminated.

As described above, in the game system 1 in the present embodiment, the player is capable of simply instructing input of the next multiple actions on the basis of the latest tapping operation. Accordingly, since the player is capable of performing the input instruction intuitively without confirming the user interface for operation input, the user-friendliness of the battle game may be improved.

Associating the action, such as the attack, requiring the continuous operation (barrage) with the circular area B1 around the specified position may allow the continuous operation to be performed while the guide graphic is being displayed, which may thereby improve the user-friendliness of the battle game. The number of angle areas divided with the guide graphic A may be increased.

Figure 13:
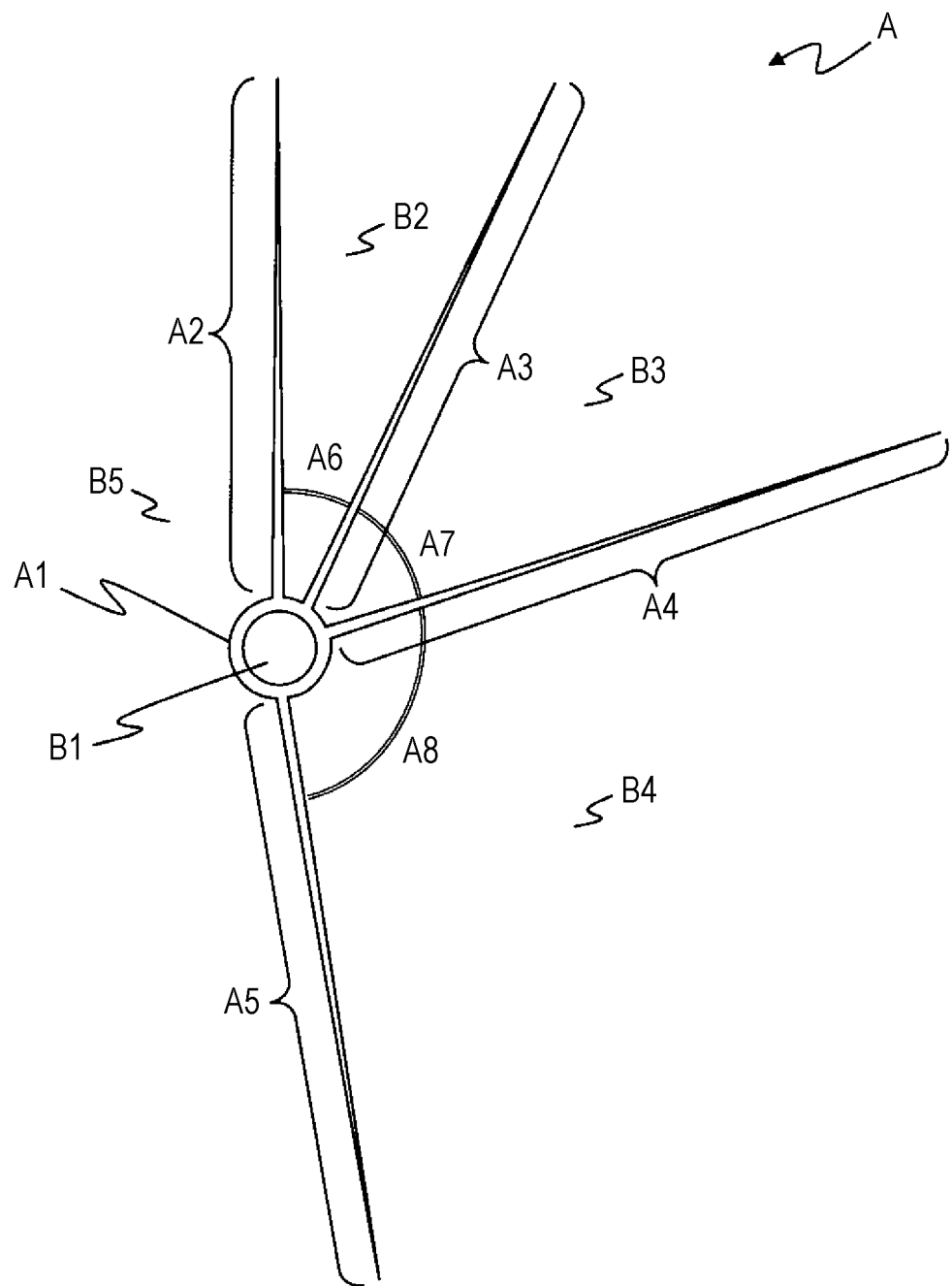
FIG. 13 is a schematic diagram for describing another example of the guide graphic.

FIG. 13 is a schematic diagram for describing another example of the guide graphic A.

Referring now to FIG. 13, the guide graphic A may be composed of the circular graphic A1 defining the circular area B1 around the specified position, the first line graphic A2 positioned on the first straight line through the specified position, the second line graphic A3 positioned on the second straight line through the specified position, a third line graphic A4 positioned on a third straight line through the specified position, and a fourth line graphic A5 positioned on a fourth straight line through the specified position. The battle game screen may be divided into the circular area B1, the first angle area B2, the second angle area B3, a third angle area B4, and a fourth angle area B5 with the circular graphic A1, the first line graphic A2, the second line graphic A3, the third line graphic A4, and the fourth line graphic A5. The first angle area B2 may be an area having an angle A6, the second angle area B3 may be an area having an angle A7, the third angle area B4 may be an area having an angle A8, and the fourth angle area B5 may be an area excluding the circular area B1, the first angle area B2, the second angle area B3, and the third angle area B4. Since the number of the angle areas is capable of being appropriately increased in the above manner even when the number of the actions associated with the angle areas is increased, the user-friendliness of the battle game may be improved.

The input processing portion 255 may vary the magnitudes of the angles A6 to A8 depending on the state of the character of the player. For example, the input processing portion 255 may increase the angle A6 with the increasing amount of the MP of the character of the player when the instruction to input the skill activation is associated with the first angle area B2. In this case, the first angle area B2 may be reduced with the decreasing amount of the MP to prevent erroneous activation of the skill consuming the MP. For example, the input processing portion 255 may increase the angle A7 with the decreasing amount of the HP of the character of the player when the instruction to input the defense is associated with the second angle area B3. In this case, since the second angle area B3 may be increased with the decreasing amount of the HP, it may be possible to facilitate selection of the defense behavior, which suppresses the decrease in the HP caused by the attack from the character which each character is to fight with when the amount of the HP is small, and to prevent erroneous input of an action other than the defense behavior.

The input processing portion 255 may vary the size of each area depending on the operation history of the player. For example, when the instruction to input the attack requiring the continuous operation (barrage) is associated with the circular area B1, the input processing portion 255 may increase the size of the circular area B1 if the number of times of the barrage for the latest three seconds exceeds a predetermined number of times. This prevents erroneous input of the barrage by the player.

When the multiple actions to be associated with the respective areas in the guide graphic A has a hierarchical data structure, such as a tree structure, the input processing portion 255 may perform the input instruction process in which the guide graphic is used stepwise. An input instruction process in which the guide graphic is used stepwise will now be described.

Figures 14A, 14B:
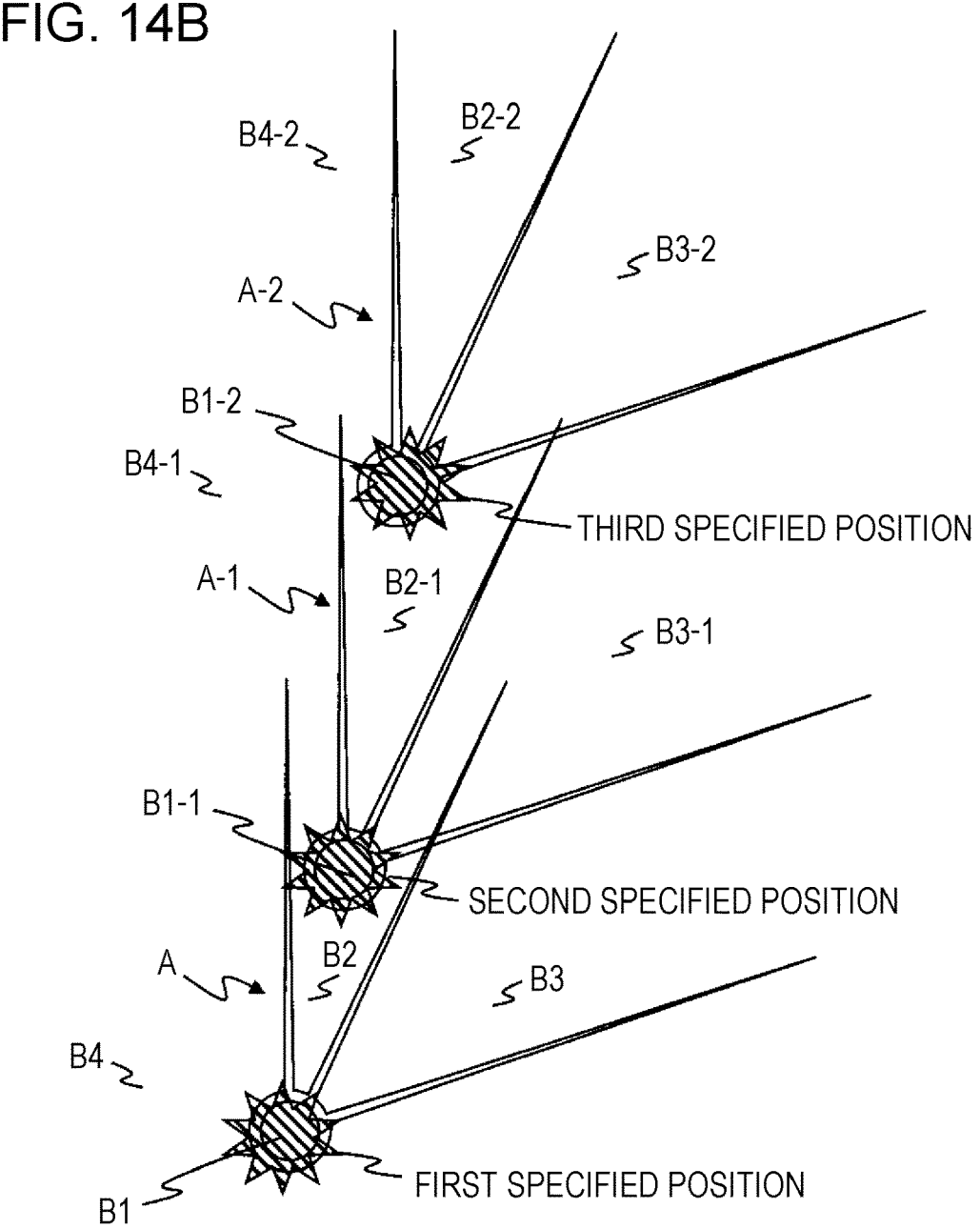
FIG. 14A is a schematic diagram providing an example of the input instruction process in which the guide graphic is used stepwise.
FIG. 14B is a schematic diagram providing an example of the input instruction process in which the guide graphic is used stepwise.

FIG. 14A is a schematic diagram for describing exemplary multiple actions having the hierarchical data structure. For example, large categories that may classify an action as a skill, an attack, a defense, and so on may be set as a high hierarchy. Middle categories to classify the skill into an offensive skill, a defensive skill, and so on may be set as a middle hierarchy. Small categories to classify the offensive skill into a fire-attribute skill, a water-attribute skill, and so on may be set as a low hierarchy. Each small category in the low hierarchy may be an action input of which is to be instructed.

FIG. 14B is a schematic diagram for describing an example of the input instruction process in which the guide graphic is used stepwise. In the guide graphic A, the battle game screen may be divided into the circular area B1 around the first specified position, the first angle area B2, the second angle area B3, and the third angle area B4. For example, the first angle area B2 may be associated with the "skill", among the large categories in the high hierarchy, and the second angle area B3 may be associated with the "attack", among the large categories in the high hierarchy.

Still referring to FIG. 14B, a guide graphic A-1 may be displayed when the own player taps on the first angle area B2 while the guide graphic A is being displayed. In the guide graphic A-1, the battle game screen may be divided into a circular area B1-1 around the second specified position, a first angle area B2-1, a second angle area B3-1, and a third angle area B4-1. For example, the first angle area B2-1 may be associated with the "offensive skill", among the middle categories in the middle hierarchy, and the second angle area B3-1 may be associated with the "defensive skill", among the middle categories in the middle hierarchy.

A guide graphic A-2 may be displayed when the own player taps on the first angle area B2-1 while the guide graphic A-1 is being displayed. In the guide graphic A-2, the battle game screen is divided into a circular area B1-2 around the third specified position, a first angle area B2-2, a second angle area B3-2, and a third angle area B4-2. For example, the first angle area B2-2 may be associated with the "fire-attribute skill", among the small categories in the low hierarchy, and the second angle area B3-2 may be associated with the "water-attribute skill", among the small categories in the low hierarchy.

Upon tapping on of the first angle area B2-2 by the own player while the guide graphic A-2 is being displayed, the "fire-attribute skill" may be activated.

Use of the input instruction process in which the guide graphic is used stepwise allows the items having the hierarchical data structure to be simply selected only with the tapping operation. The input instruction process in which the guide graphic is used stepwise may not be limited to the instruction to input the action. For example, the input instruction process in which the guide graphic is used stepwise may be used in a case in which menus are hierarchically selected. The input instruction process in which the guide graphic is used stepwise may be used in any field other than the game field as long as items having the hierarchical data structure are selected.

While the preferred embodiments of the invention have been described above, it will be recognized and understood that various modifications can be made in the invention and the appended claims are intended to cover all such modifications which may fall within the spirit and scope of the invention.

What is claimed is:

1. A computer program product embodied on a non-transitory computer readable medium, comprising code executable by a computer arranged to operate a computer game, the computer having at least a processor, a storage unit, and a display screen configured to provide a graphical user interface, to cause the computer to carry out the following steps:

receiving, on the graphical user interface, a first input instruction designating a first position on the graphical user interface;

displaying, on the graphical user interface, a guide graphic, the guide graphic comprising a plurality of line graphics originating from the first position and forming a predetermined angle, wherein a first area is interior to the predetermined angle; and receiving, on the graphical user interface, a first area input instruction provided within the first area, and executing a first action to be performed by the character of the player when the first area input instruction is received within the first area.

2. The computer program product of claim 1, wherein the guide graphic further comprises a second area centered on the first position; and wherein the computer program product further causes the computer to carry out the step of:

receiving, on the graphical user interface, a second area input instruction provided within the second area, and executing a second action to be performed by the character of the player when the second area input instruction is received within the second area.

3. The computer program product of claim 1, wherein the step of displaying the guide graphic comprises:

displaying the guide graphic for a predetermined time period, and, upon expiration of the predetermined time period, ending the display of the guide graphic;

and wherein the computer program product further causes the computer to carry out the steps of:

receiving, on the graphical user interface, a second input instruction designating a second position on the graphical user interface, wherein the second position is different from the first position; and displaying, on the graphical user interface, the guide graphic, the guide graphic comprising the plurality of line graphics originating from the second position.

4. The computer program product of claim 2, wherein the computer program product further causes the computer to carry out the steps of:

receiving, on the graphical user interface, a plurality of second area input instructions provided within the second area;

determining if a number of the plurality of second area input instructions exceeds a predetermined number; and when the number of the plurality of second area input instructions exceeds the predetermined number, adjusting a size of the second area.

5. The computer program product of claim 1, wherein the computer program product further causes the computer to carry out the steps of:

determining a parameter associated with a state of the character; and setting a size of the predetermined angle based on a value of the parameter.

6. The computer program product of claim 5, wherein the step of executing the first action further comprises:

decrementing the parameter associated with the state of the character; and adjusting the size of the predetermined angle.

7. The computer program product of claim 1, wherein the guide graphic further comprises a third area, wherein the plurality of line graphics of the guide graphic originating from the first position further form a second predetermined angle, wherein the third area is interior to the second predetermined angle; and wherein the computer program product further causes the computer to carry out the steps of:

receiving, on the graphical user interface, a third area input instruction provided within the third area, and executing a third action to be performed by the character of the player when the third area input instruction is received within the third area.

8. The computer program product of claim 1, wherein the computer program product further causes the computer to carry out the steps of:

receiving the first area input instruction provided within the first area, and displaying a plurality of areas associated with the first area, each of the plurality of areas associated with a different first action to be performed by the character of the player;

receiving, on the graphical user interface, a first action selection instruction provided within one of the plurality of areas associated with the first area; and executing the first action to be performed by the character of the player based on the first action selection instruction.

9. A computer-implemented method, comprising executing on a computer having at least a processor, a storage unit, and a display screen configured to provide a graphical user interface, the following steps:

receiving, on the graphical user interface, a first input instruction designating a first position on the graphical user interface;

displaying, on the graphical user interface, a guide graphic, the guide graphic comprising a plurality of line graphics originating from the first position and forming a predetermined angle, wherein a first area is interior to the predetermined angle; and receiving, on the graphical user interface, a first area input instruction provided within the first area, and executing a first action to be performed by the character of the player when the first area input instruction is received within the first area.

10. The method of claim 9, wherein the guide graphic further comprises a second area centered on the first position; and wherein the method further comprises the step of:

receiving, on the graphical user interface, a second area input instruction provided within the second area, and executing a second action to be performed by the character of the player when the second area input instruction is received within the second area.

11. The method of claim 9, wherein the step of displaying the guide graphic comprises:

displaying the guide graphic for a predetermined time period, and, upon expiration of the predetermined time period, ending the display of the guide graphic;

and wherein the method further comprises:

receiving, on the graphical user interface, a second input instruction designating a second position on the graphical user interface, wherein the second position is different from the first position; and displaying, on the graphical user interface, the guide graphic, the guide graphic comprising the plurality of line graphics originating from the second position.

12. The method of claim 9, further comprising the steps of:

determining a parameter associated with a state of the character; and setting a size of the predetermined angle based on a value of the parameter.

13. The method of claim 9, wherein the guide graphic further comprises a third area, wherein the plurality of line graphics of the guide graphic originating from the first position further form a second predetermined angle, wherein the third area is interior to the second predetermined angle; and wherein the method further comprises the steps of:
receiving, on the graphical user interface, a third area input instruction provided within the third area, and executing a third action to be performed by the character of the player when the third area input instruction is received within the third area.

14. The method of claim 9, wherein the method further comprises the steps of:
receiving the first area input instruction provided within the first area, and displaying a plurality of areas associated with the first area, each of the plurality of areas associated with a different first action to be performed by the character of the player;
receiving, on the graphical user interface, a first action selection instruction provided within one of the plurality of areas associated with the first area; and
executing the first action to be performed by the character of the player based on the first action selection instruction.

15. An information processing apparatus configured to provide a game, wherein the information processing apparatus comprises:
an input processing unit configured to receive an input instruction designating a first position; and
a display unit configured to display a guide graphic comprising a plurality of line graphics originating from the first position and forming a predetermined angle, wherein a first area is interior to the predetermined angle; and
wherein the input processing unit is further configured to receive a first area input instruction provided within the first area, and execute a first action to be performed by the character of the player when the first area input instruction is received within the first area.

16. The information processing apparatus of claim 15, wherein the guide graphic further comprises a second area centered on the first position; and wherein the input processing unit is further configured to receive a second area input instruction provided within the second area, and execute a second action to be performed by the character of the player when the second area input instruction is received within the second area.

17. The information processing apparatus of claim 15, wherein the display unit is configured to display the guide graphic for a predetermined time period, and, upon expiration of the predetermined time period, end the display of the guide graphic;
wherein the input processing unit is further configured to receive a second input instruction designating a second position on the graphical user interface, wherein the second position is different from the first position; and
wherein the display unit is configured to display the guide graphic, the guide graphic comprising the plurality of line graphics originating from the second position.

18. The information processing apparatus of claim 15, wherein the information processing apparatus is further configured to:
determine a parameter associated with a state of the character; and
set a size of the predetermined angle based on a value of the parameter.

19. The information processing apparatus of claim 15, wherein the guide graphic further comprises a third area, wherein the plurality of line graphics of the guide graphic originating from the first position further form a second predetermined angle, wherein the third area is interior to the second predetermined angle; and
wherein the input processing unit is further configured to receive a third area input instruction provided within the third area, and execute a third action to be performed by the character of the player when the third area input instruction is received within the third area.

20. The information processing apparatus of claim 15, wherein the input processing unit is further configured to receive the first area input instruction provided within the first area,
wherein the display unit is further configured to display a plurality of areas associated with the first area, each of the plurality of areas associated with a different first action to be performed by the character of the player; and
wherein the input processing unit is further configured to receive a first action selection instruction provided within one of the plurality of areas associated with the first area, and execute the first action to be performed by the character of the player based on the first action selection instruction.

* * * * *